United States Patent
Kennedy, Jr. et al.

(10) Patent No.: US 7,168,880 B2
(45) Date of Patent: Jan. 30, 2007

(54) IMPACT ATTENUATOR SYSTEM

(75) Inventors: James C. Kennedy, Jr., Worthington, OH (US); Charles R. Miele, Upper Arlington, OH (US); Chuck A. Plaxico, Westerville, OH (US); Joseph R. Preston, Radnor, OH (US); Jay R. Sayre, Gahanna, OH (US); W. Scott Versluis, Dublin, OH (US); Carl J. Serman, Cranberry Township, PA (US); Kary L. Valentine, Mars, PA (US)

(73) Assignee: Battelle Memorial Institute, Columbus, OH (US)

( * ) Notice: Subject to any disclaimer, the term of this patent is extended or adjusted under 35 U.S.C. 154(b) by 178 days.

(21) Appl. No.: 10/991,080

(22) Filed: Nov. 17, 2004

(65) Prior Publication Data

US 2006/0103061 A1    May 18, 2006

(51) Int. Cl.
  *E01F 9/011*    (2006.01)
  *E01F 13/02*    (2006.01)
(52) U.S. Cl. .................... 404/6; 404/9; 404/10
(58) Field of Classification Search ............ 404/6, 404/9, 10
  See application file for complete search history.

(56) References Cited

U.S. PATENT DOCUMENTS

| | | |
|---|---|---|
| 3,672,657 A | 6/1972 | Young et al. |
| 3,674,115 A | 7/1972 | Young et al. |
| 3,680,662 A | 8/1972 | Walker et al. |
| 3,845,936 A | 11/1974 | Boedecker, Jr. et al. |
| 3,847,678 A * | 11/1974 | Furr ............... 148/547 |
| 3,856,268 A | 12/1974 | Fitch |
| 3,982,734 A | 9/1976 | Walker |
| 4,237,240 A | 12/1980 | Jarre et al. |
| 4,321,989 A | 3/1982 | Meinzer |
| 4,352,484 A | 10/1982 | Gertz et al. |
| 4,407,484 A | 10/1983 | Meinzer |
| 4,452,431 A | 6/1984 | Stephens et al. |
| 4,583,716 A | 4/1986 | Stephens et al. |
| 4,645,375 A | 2/1987 | Carney, III |
| 4,674,911 A | 6/1987 | Gertz |
| 4,722,946 A | 2/1988 | Hostettler |
| 4,815,565 A | 3/1989 | Sicking et al. |

(Continued)

FOREIGN PATENT DOCUMENTS

DE    003106694 A1    9/1992

(Continued)

OTHER PUBLICATIONS

Parks et al., Generation of Microcellular Polyurethans Via Polymerization in Carbob Dioxide. II: Foam Formation and Characterization; Polymer Engineering ans Science; Mid-Oct. 1996; Col. 36; No. 19; pp. 2417-2431.

(Continued)

*Primary Examiner*—Raymond Addie
(74) *Attorney, Agent, or Firm*—Barry S. Bissell

(57) ABSTRACT

An impact attenuator system includes a hyperelastic member that comprises an energy absorbing material which behaves in a rate-independent hyperelastic manner so that its permanent set is minimized and the material can absorb tremendous amounts of impact energy while remaining fully recoverable.

15 Claims, 17 Drawing Sheets

U.S. PATENT DOCUMENTS

| | | |
|---|---|---|
| 5,011,326 A | 4/1991 | Carney, III |
| 5,112,028 A | 5/1992 | Laturner |
| 5,195,727 A | 3/1993 | Liao et al. |
| 5,314,261 A | 5/1994 | Stephens |
| 5,403,122 A | 4/1995 | Carney, III |
| 5,462,144 A | 10/1995 | Guardiola et al. |
| 5,579,699 A | 12/1996 | Dannawi et al. |
| 5,660,116 A | 8/1997 | Dannawi et al. |
| 5,746,419 A | 5/1998 | McFadden et al. |
| 5,791,811 A | 8/1998 | Yoshino |
| 5,797,592 A | 8/1998 | Machado |
| 5,851,005 A | 12/1998 | Muller et al. |
| 5,957,435 A | 9/1999 | Bronstad |
| 6,010,275 A | 1/2000 | Fitch |
| 6,085,878 A | 7/2000 | Araki et al. |
| 6,126,144 A | 10/2000 | Firsch et al. |
| 6,149,134 A | 11/2000 | Bank et al. |
| 6,168,346 B1 | 1/2001 | Ernsberger |
| 6,179,516 B1 | 1/2001 | Ivey et al. |
| 6,340,268 B1 | 1/2002 | Alberson et al. |
| 6,409,417 B1 | 6/2002 | Muller et al. |
| 6,410,609 B1 | 6/2002 | Taylor et al. |
| 6,427,983 B1 | 8/2002 | Leonhardt et al. |
| 6,461,076 B1 | 10/2002 | Stephens et al. |
| 6,533,250 B2 | 3/2003 | Arthur |
| 6,533,495 B1 | 3/2003 | Williams et al. |
| 6,536,985 B2 | 3/2003 | Albritton |
| 6,536,986 B1 | 3/2003 | Anghileri et al. |
| 6,554,529 B2 | 4/2003 | Stephens et al. |
| 6,623,204 B2 | 9/2003 | Buehler |
| 6,773,201 B2 | 8/2004 | Witcher |
| 6,863,467 B2 | 3/2005 | Buehler et al. |
| 6,942,263 B2 | 9/2005 | Welch et al. |
| 2001/0014254 A1 | 8/2001 | Albritton |
| 2002/0090260 A9 | 7/2002 | Albritton |
| 2003/0057410 A1 | 3/2003 | Denman et al. |
| 2003/0168650 A1 | 9/2003 | Albertson et al. |
| 2003/0175076 A1 | 9/2003 | Albritton |
| 2003/0210953 A1 | 11/2003 | Williams et al. |
| 2003/0234390 A1 | 12/2003 | Bronstad |
| 2004/0016916 A1 | 1/2004 | Bronstad |
| 2004/0074723 A1 | 4/2004 | Tsai et al. |
| 2004/0129518 A1 | 7/2004 | Tamada et al. |
| 2004/0195064 A1 | 10/2004 | Tamada et al. |

FOREIGN PATENT DOCUMENTS

| | | |
|---|---|---|
| EP | 000149567 A2 | 7/1985 |
| EP | 000437414 A1 | 7/1991 |
| JP | 356131848 A | 10/1981 |
| JP | 02001200513 A | 7/2001 |

OTHER PUBLICATIONS

Woods, George; The ICI Polyurethanes Book, Second Edition; Published jointly by ICI Polyurethanes and John Wiley & Sons; Polyols—pp. 35-41 and Cast Polyurethane Elastomers (CPU)—pp. 182-187; printed in Netherlands.

* cited by examiner

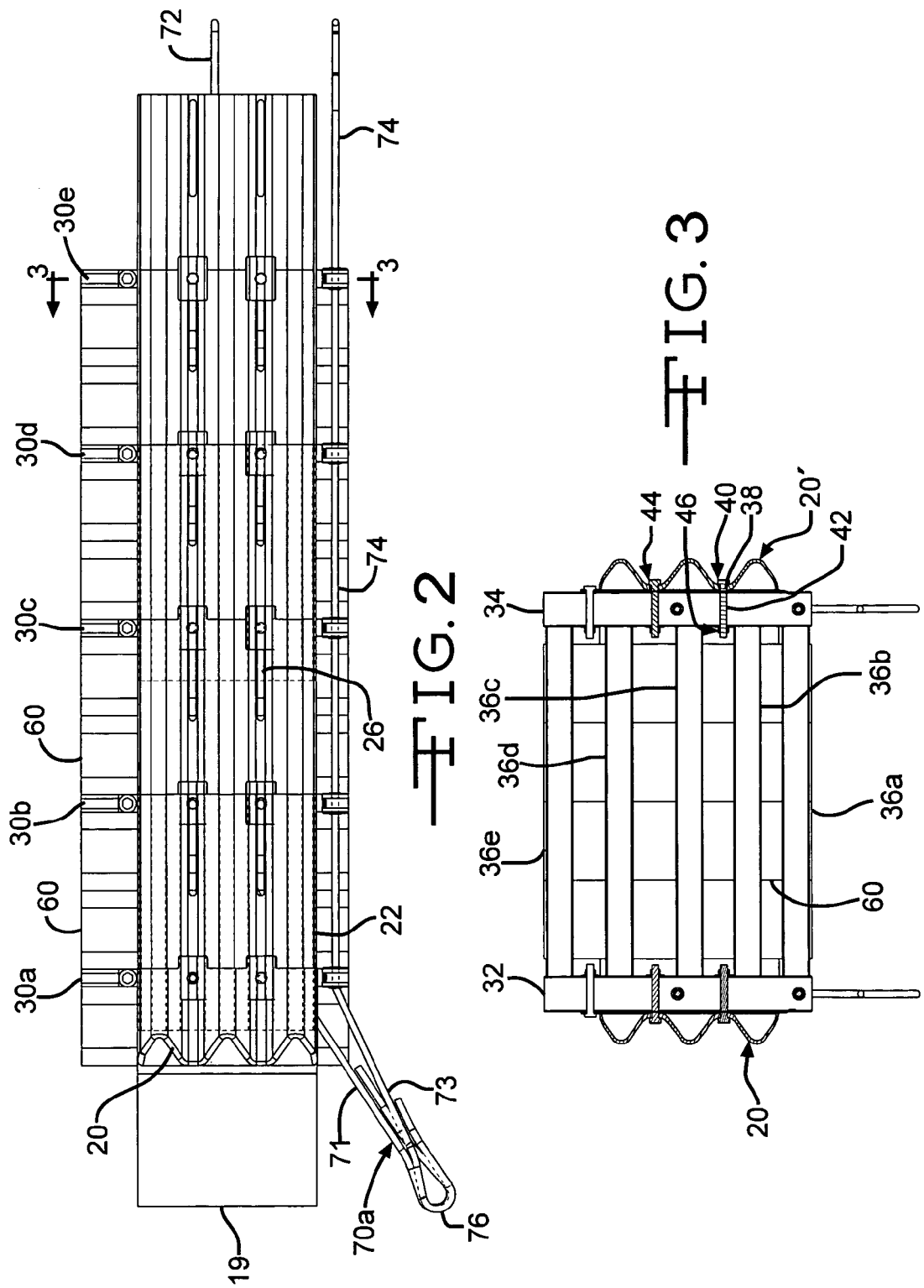

IMPACT ATTENUATOR SYSTEM

BACKGROUND OF THE INVENTION

The present invention relates to an energy absorbing apparatus. The invention relates in general to a fully redirective and non-gating impact attenuator apparatus.

Many types of energy absorbing devices are positioned along highways and racetracks to prevent vehicles from crashing into stationary structures and to lessen the injuries to occupants of the vehicle and to lessen the impact and damage that will occur to the vehicle.

In the past, many of these devices have been rigid structures that restrain the vehicle from leaving the highway. One problem is that the vehicle itself is crushed and bears the brunt of the impact. Another problem with rigid barrier is that the vehicle may rebound back onto the highway and into oncoming traffic. See for example, U.S. Pat. No. 3,845,936 to Boedecker, Jr. et al., issued Nov. 5, 1974, which discloses a rigid barrier composed of aligned barrels.

Other types of barriers include energy absorbing barrier devices that are placed along highways and raceways. Many types of such barrier have been proposed. For example, one type of barrier device uses one-time collapsible energy absorbing materials that are crushed or broken away upon impact. These types of devices are damaged or destroyed during impact and must be replaced after a single impact which is time consuming, expensive and leaves the roadway unprotected during the repair time. See for example, U.S. Pat. No. 3,982,734, to Walker, issued Sep. 28, 1976; U.S. Pat. No. 4,321,989 to Meinzer issued Mar. 30, 1982; U.S. Pat. No. 4,352,484 to Gertz et al., issued Oct. 5, 1982; U.S. Pat. No. 4,815,565 to Sicking et al., issued Mar. 28, 1989; U.S. Pat. No. 5,797,592 to Machado, issued Aug. 25, 1998; U.S. Pat. No. 5,851,005 to Muller et al., issued Dec. 22, 1998; U.S. Pat. No. 5,957,435 to Bronstad, issued Sep. 28, 1999; U.S. Pat. No. 6,126,144 to Hirsch et al., issued Oct. 3, 2000; U.S. Pat. No. 6,409,417 to Muller et al., issued Jun. 25, 2002; U.S. Pat. No. 6,536,985 to Albritton, issued Mar. 25, 2003; US2001/0014254 to Albritton published Aug. 16, 2001; US2002/0090260 Albritton, published Jul. 11, 2002; US2003/0175076A1 to Albritton, published Sep. 18, 2003; US2003/0234390 to Bronstad, published Dec. 25, 2003; US2004/0016916 to Bronstad, published Jan. 29, 2004; EP 000149567A2 to DuPuis published Jul. 24, 1985; DE003106694A1 to Urberger, published September 1982;

U.S. Pat. No. 4,674,911 to Gertz, issued Jun. 23, 1987, relies on air chambers to supply resiliency to the barrier.

U.S. Pat. No. 4,407,484 to Meinzer, issued Oct. 4, 1983, discloses a barrier system that relies on springs for resiliency and attenuation of the vehicle's impact. Various barrier systems use fluid to lessen the vehicle impact. See, for example: U.S. Pat. No. 4,452,431 to Stephens et al., issued Jun. 5, 1984, and U.S. Pat. No. 4,583,716 to Stephens et al., issued Apr. 22, 1986, disclose water filled buffer cartridges that are restrained with cables in a pivotable diaphragm. Likewise, U.S. Pat. No. 3,672,657 to Young et al., issued Jun. 27, 1972, and U.S. Pat. No. 3,674,115 to Young et al, issued Jul. 4, 1972, issued disclose liquid filled containers arranged in a barrier system; U.S. Pat. No. 3,680,662 to Walker et al., issued Aug. 1, 1972, shows clusters of liquid filled buffers.

Various other systems include reusable energy absorbing devices. For example: U.S. Pat. No. 5,112,028 to Laturner, issued May 12, 1992; U.S. Pat. No. 5,314,261 to Stephens, issued May 24, 1994; U.S. Pat. No. 6,010,275 to Fitch, issued Jan. 4, 2000; U.S. Pat. No. 6,085,878 to Araki et al., issued Jul. 11, 2000; U.S. Pat. No. 6,149,134 to Banks et al, issued Nov. 21, 2000; U.S. Pat. No. 6,553,495 to Williams et al., issued Mar. 18, 2003; U.S. Pat. No. 6,554,429 to Stephens et al., issued Apr. 29, 2003; US2003/0210953 A1 to Williams et al., published Nov. 13, 2003; JP 356131848A to Miura et al., published Oct. 15, 1981; EP 000437313A1 to Guerra, published Jul. 17, 1991.

U.S. Pat. No. 4,237,240 to Jarre et al., issued Dec. 2, 1980, discloses a flexible polyurethane foam having a high-load bearing capacity and a large energy absorption capacity upon impact.

U.S. Pat. No. 4,722,946 to Hostettler, issued Feb. 2, 1988, discloses energy absorbing polyurethane elastomers and foams.

U.S. Pat. No. 6,410,609 to Taylor et al., issued Jun. 25, 2002, discloses low pressure polyurethane foams.

There is a need for an impact attenuator barrier system which minimizes or prevents injury to occupants of a vehicle.

There is a further need for an impact attenuator barrier system vehicle that is fully recoverable upon impact.

There is a further need for an impact attenuator barrier system that is economical, reliable in operation and easy to install and maintain.

There is a further need for an impact attenuator barrier system that is useful in various environments, including, for example, public highways, racetrack, and marine applications including protecting piers.

There is a further need for an impact attenuator barrier system that will absorb impact energies from trucks and cars traveling at high speeds.

There is a further need for an impact attenuator barrier system that, when impacted, does not disintegrate and cause debris to be scattered around the site of impact.

SUMMARY OF THE INVENTION

In one aspect, the present invention relates to an impact attenuator barrier system for vehicle safety that benefits from the interrelationship of a number of features: the use of a cast thermoset polyurethane elastomeric composition in the impact attenuator barrier system, the method of forming such elastomeric composition using certain prescribed mixing and processing steps, the shape of the elastomeric barrier members, and the assembly of the barrier members into the impact attenuator barrier system.

In another aspect, the present invention relates to an impact attenuator system having side beam assemblies and a nose assembly secured to the side beam assemblies. The side beam assemblies include a plurality of side panels where adjacent side panels overlap such that the side panel members are in a nested linear arrangement. At least one diaphragm panel is positioned between opposing side panels and is secured to the opposing side panels by at least one securing mechanism. The opposing side panels and the diaphragm panels define at least one bay. At least one hyperelastic member is positioned in the at least one bay. At least one anchoring system includes at least one cable which secures the side panels and diaphragm panels together.

In a specific aspect, the present invention further relates to an impact attenuator system where the hyperelastic member comprises an energy absorbing material that behaves in a rate-independent hyperelastic manner such that its permanent set is minimized so that the material maintains consistent force-displacement characteristics over a wide range of impact energy while remaining fully recoverable.

In another specific aspect, the present invention further relates to a roadway barrier comprising at least one hyperelastic member. The hyperelastic member comprises an energy absorbing material that behaves in a rate-independent hyperelastic manner such that its permanent set is minimized so that the energy absorbing material maintains consistent force-displacement characteristics over a wide range of impact velocities while remaining fully recoverable.

In yet another specific aspect, the present invention relates to an energy absorbing hyperelastic material which comprises a mixture of reactive components comprising an MDI-polyester and/or an MDI-polyether prepolymer, at least one long-chain polyester and/or polyether polyol, at least one short-chain diol, and at least one catalyst. The hyperelastic material behaves in a rate-independent hyperelastic manner and has a permanent set that is minimized so that the hyperelastic material absorbs tremendous amounts of impact energy while remaining fully recoverable when used in energy-absorbing applications. In certain embodiments the reactive components are combined in a proportion that provides about 1–10% excess of isocyanate groups in the total mixture.

It is to be understood that the hyperelastic material is especially suitable for use in various impact attenuating environments and products. As such, it is within the contemplated scope of the present invention that a wide variety of other types of products can be made using the hyperelastic materials of the present invention. Examples of such products include, but are not limited to, protective gear for work and sports, including helmets and pads, car seats, pedestal seats on helicopters, bumpers for loading docks, and the like.

In yet another specific aspect, the present invention relates to a method for making hyperelastic materials which comprising combining reactive components in certain preferred proportions and providing sufficient processing times such that there is a desired level of reactivity. The method thereby allows ample pour time and minimize de-mold time during manufacture.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a schematic illustration, in side elevation view, of the embodiment shown in FIG. 1.

FIG. 3 is a schematic illustration, in an end elevational view, as taken along the line 3—3 in FIG. 2.

DETAILED DESCRIPTION OF THE PREFERRED EMBODIMENT(S)

Figure 1:
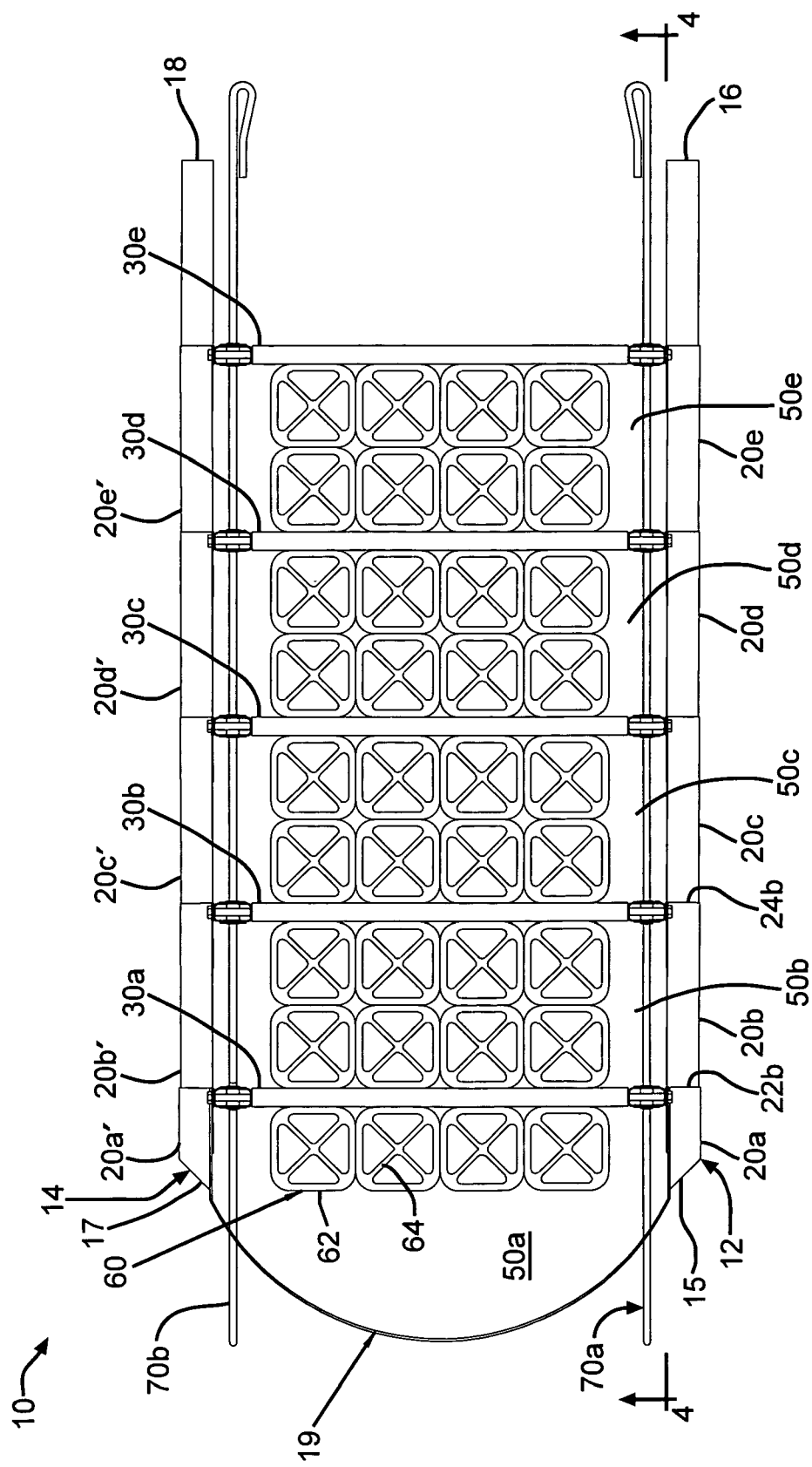
FIG. 1 is a schematic illustration, in plan view, of one embodiment of an impact attenuator system.
Figure 4:
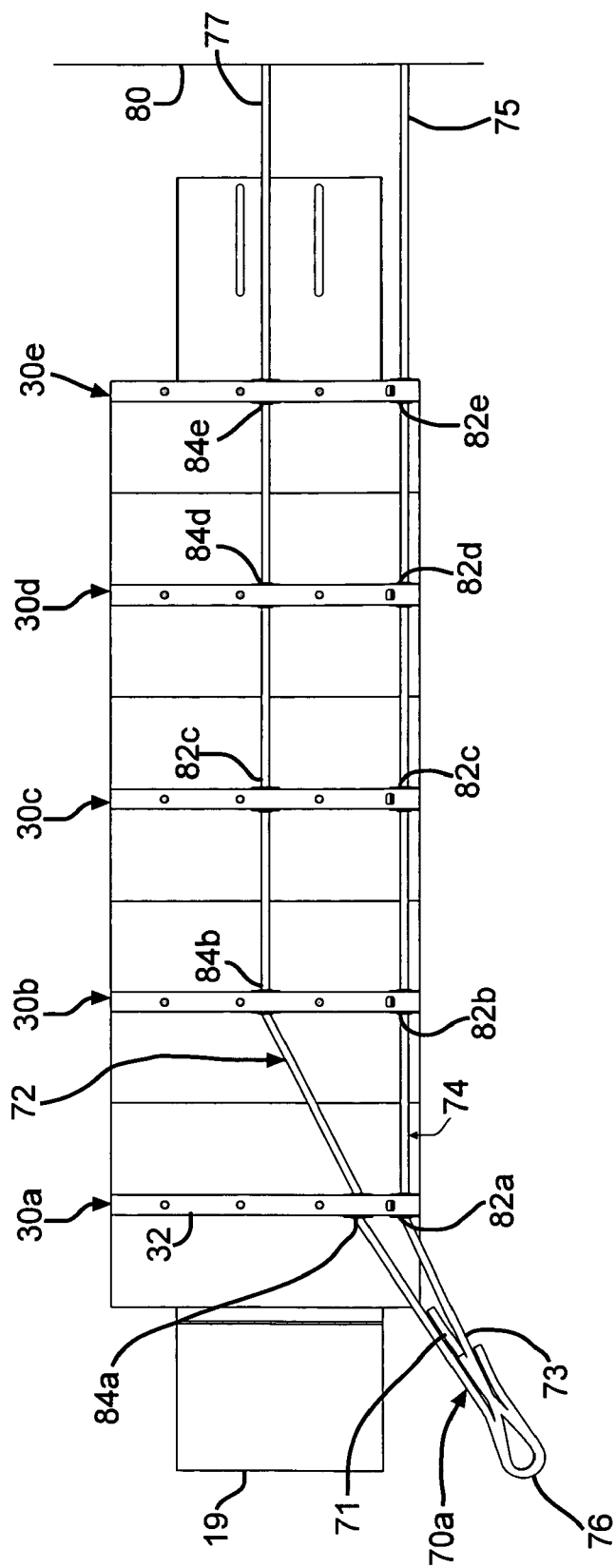
FIG. 4 is a schematic illustration, in side elevation, taken along the line 4—4 in FIG. 1.

In one aspect, the present invention is directed to an impact attenuator barrier system, particularly for use in vehicle applications such as racetracks and highways or in protecting piers and the like.

In another aspect, the present invention provides an impact attenuator system which incorporates an array of unique, fully recoverable hyperelastic energy absorbing elements.

In another aspect, the present invention provides a roadway barrier comprising at least one hyperelastic member, wherein the hyperelastic member comprises an energy absorbing material that behaves in a rate-independent hyperelastic manner wherein its permanent set is minimized so that the energy absorbing material maintains consistent force-displacement characteristics over a wide range of impact velocities while remaining fully recoverable.

Referring now to FIGS. 1–6, one embodiment of the impact attenuator system is shown. The impact attenuator system 10 includes a first side beam assembly 12 and an opposing, or second, side beam assembly 14. The first and second beam assemblies 12 and 14 are in opposed relationship. In the embodiments shown, the first and second beam assemblies 12 and 14 are in opposed and parallel relationship. It is to be understood, however, that in other embodiments, the beam assemblies do not need to be parallel. For, example, in certain highway applications, it is desired that the beam assemblies have a tapered configuration in order to accommodate abutment geometry and/or provide stage reaction force from the system (e.g., the rear bays may incorporate a more narrow array of energy dissipating material while the front bays incorporate a more narrow array of energy dissipating material to provide softer response in the early stage of impact and a more still response as the vehicle proceeds further into the system). The first beam assembly 12 has a first, or leading, end 15 and a second end 16. Likewise, the second beam assembly 14 has a first, or leading, end 17 and a second end 18.

The impact attenuator system 10 also includes a nose assembly 19 that is secured in a suitable manner to the first end 15 of the first beam assembly 12 and to the first end 17 of the second beam assembly 14.

Figure 5:
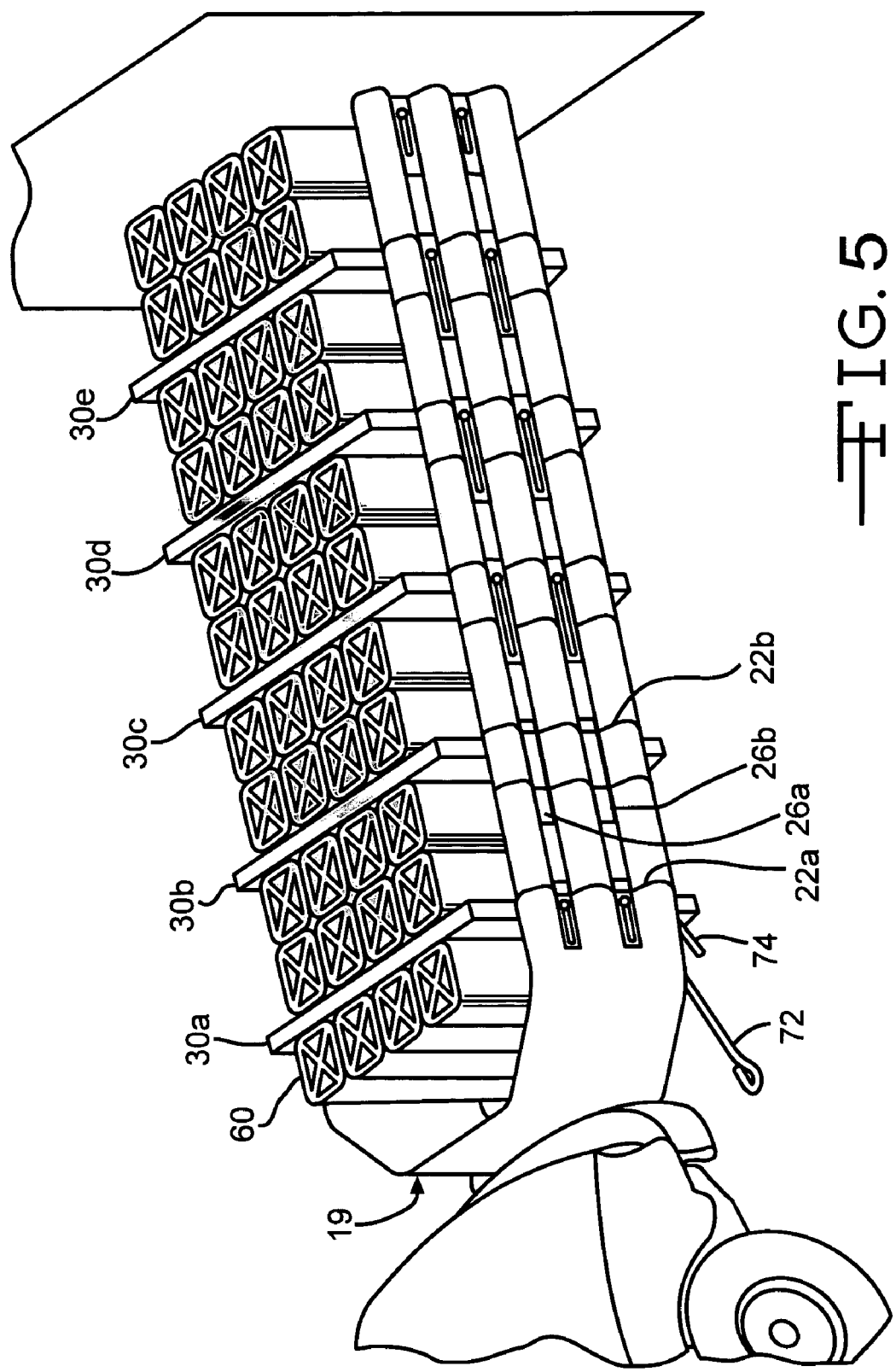
FIG. 5 is a schematic illustration, in a perspective view, of the embodiment shown in FIG. 1.

Each side beam assembly 12 and 14 further includes a plurality of side panels generally shown here as 20a, 20b, 20c, 20d and 20e. For ease of illustration it should be understood that each side beam assembly 12 and 14 have similar side panel members where the side panels that comprise the side beam assembly 12 are designated as 20a–20e and the side panels that comprise the side beam assembly 14 are designated as 20'a–20e'; only one side will be discussed in detail for ease of explanation. The first side panel 20a has a first end 22a and a second end 24a; likewise each subsequent panel 20b, etc. has first ends 22b, etc., and second ends 24b, etc. The second end 24a overlaps the first end 22b of the adjacent panel 20b. Likewise, each adjacent panel has overlapping first and second ends. The side panel members 20a–20e are in a nested linear arrangement. The side panel members 20a'–20e' are also in a nested linear arrangement. Each side panel 20 can have a three-dimensional shape, such as a wave, or corrugated, shape, as shown in FIGS. 3 and 5. It should be understood that the side panels 20 can have other suitable dimensions, as will become apparent from the following description.

Each side panel 20 generally defines at least one longitudinally extending opening 26. As best seen in the embodiment shown in FIG. 5, each side panel 20 has an upper longitudinally extending opening, or slot, 26a and a lower longitudinally extending opening, or slot, 26b that are in parallel relationship. The slot 26a on the side panel 20a at least partially overlaps the adjacent slot 26a on the adjacent side panel 20b; likewise, each adjacent side panel has overlapping slots 26.

The impact attenuator system 10 further includes a plurality of diaphragm panels generally shown here as 30a, 30b, 30c, 30d and 30e. For ease of illustration it should be understood that each diaphragm panel can have the same features, and that only one diaphragm panel will be discussed in detail for ease of explanation. As best seen in FIG. 3, the each of the diaphragm panel 30 can be comprised of first and second upright members 32 and 34 and at least one or more cross members, generally shown as 36a, 36b, 36c, 36d and 36e, which extend between the first and second upright members 32 and 34. The first and second upright members include a plurality of spaced apart openings 38. Each opening 38 can receive a securing mechanism 40. In other embodiments, the diaphragm panel 30 can have other configurations for the cross members 36, such as formed into an X shape (not shown) or other suitable configuration.

The first diaphragm panel 30a is positioned between opposing side panels 20a and 20a' at substantially a right angle. The first diaphragm panel 30a is secured to the opposing side panels 20a and 20a' by one of the securing mechanisms 40. The securing mechanism 40 can comprise at least one screw-type member 42 that can have a head that is wider than the width of the slot 26; alternatively the securing mechanism 40 can include at least one washer-type member 44 that axially fits over the screw-type member 42 such that the washer-type member has length and width dimensions that are greater than the width of the slot 26. The screw-type member 42 extends from the outer surface of the side panel 20 through the slot 26, through the adjacent opening 38 in the upright member 32 (or 34) of the diaphragm panel 30, and is held in position with a suitable locking member 46, such as a hex nut. It is to be understood that the securing mechanism 40 is capable of being longitudinally moved along the slot 26, as will be more fully explained below.

As at least partially assembled, the impact attenuator system 10 includes a plurality of opposing side panels 20a–20e and 20a'–20e' and a plurality of diaphragm panels 30a–30e. As assembled, the first opposing side panels 20a and 20a' are secured to the first diaphragm panel 30a. That is, the first upright member 32 of the diaphragm panel 30 is secured to the first side panel 20a and the second upright member 24 of the diaphragm panel 30a is secured to the first opposing side panel 20a' by having securing mechanisms 40 extend through the slots 26 in the side panels 20 and through the adjacent opening 38 in the upright member 32 (or 34). Likewise, the remaining side panels are secured to the remaining diaphragm panels.

The impact attenuator system 10 thus defines a plurality of bays 50a–50e. Each bay 50 is defined by the opposing side panels 20 and diaphragm panels 30. As best seen in FIG. 1, the bay 50a is defined by the opposing side panels 20a and 20a' and by the diaphragm panel 30a and the nose assembly 19. Likewise, the remaining bays 50b–50e are defined by corresponding side panels and diaphragm panels. It is to be understood that the impact attenuator system 10 can include fewer or more side panels and diaphragm panels, and that the numbers and dimensions of such side panels and diaphragm panels will depend, at least in part, on the end use and the object which is being protected.

Figure 19:
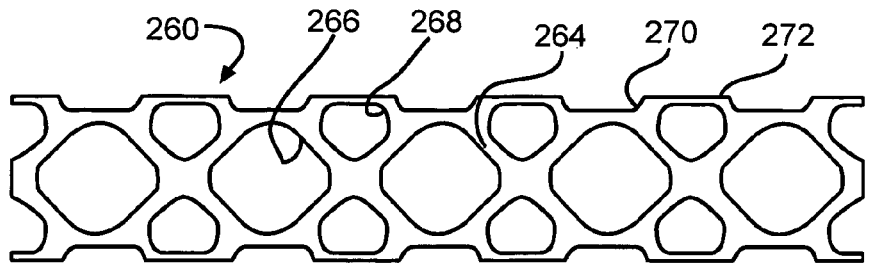
FIG. 19 is a schematic illustration of a cross-sectional view of an alternative embodiment of a hyperelastic member useful in the impact attenuator system.

The impact attenuator system 10 includes a plurality, or array, of hyperelastic members 60. In the embodiment shown, each hyperelastic member 60 has a substantially tubular or columnar shaped sidewalls 62 and at least one interior structural member 64. In the embodiment shown, the structural member 64 generally has an X-shaped cross-section such that the structural member 64 defines at least one internal opening 66. It is to be understood that the hyperelastic members 60 can have specific shapes and dimensions that best meet the end use requirements. For example, in one embodiment, as shown in the figures herein, the hyperelastic members 60 have a generally square pillar conformation and have an x-shaped structural cross-section 64 which allows each hyperelastic member 60 to most effectively absorb impact energies, as will be further explained below. It is to be understood that the shape of the hyperelastic member 60 can have different configurations. For example, FIG. 19 is a schematic illustration of an alternative embodiment of a hyperelastic member 260 having a plurality of structural members 264 that define alternating large openings 266 and small openings 268. The hyperelastic member 260 also defines a plurality of external openings 270 that are spaced along the external surface 272 of the structural member 260.

Figure 20:
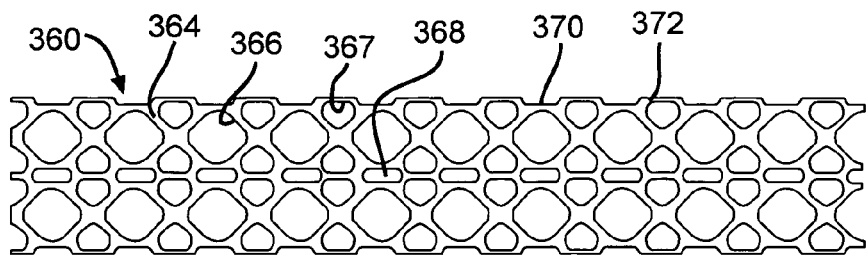
FIG. 20 is a schematic illustration of a cross-sectional view of an alternative embodiment of a hyperelastic member useful in the impact attenuator system.

FIG. 20 is a schematic illustration of an alternative embodiment of a hyperelastic member 360 having a plurality of structural members 364 that define alternating large openings 366, medium openings 367, and small openings 368. The hyperelastic member 360 also defines a plurality of external openings 370 that are spaced along the external surface 372 of the structural member 360.

Figure 21:
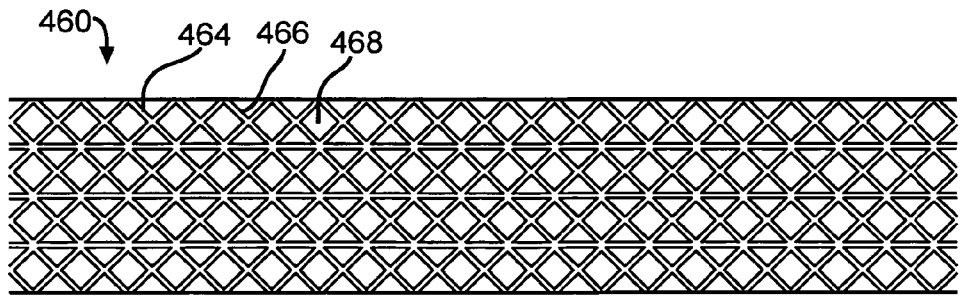
FIG. 21 is a schematic illustration of a cross-sectional view of an alternative embodiment of a hyperelastic member useful in the impact attenuator system.

FIG. 21 is a schematic illustration of an alternative embodiment of a hyperelastic member 460 having a plurality of structural members 464 that define alternating triangular openings 466 and diamond shaped openings 468.

Figure 22:
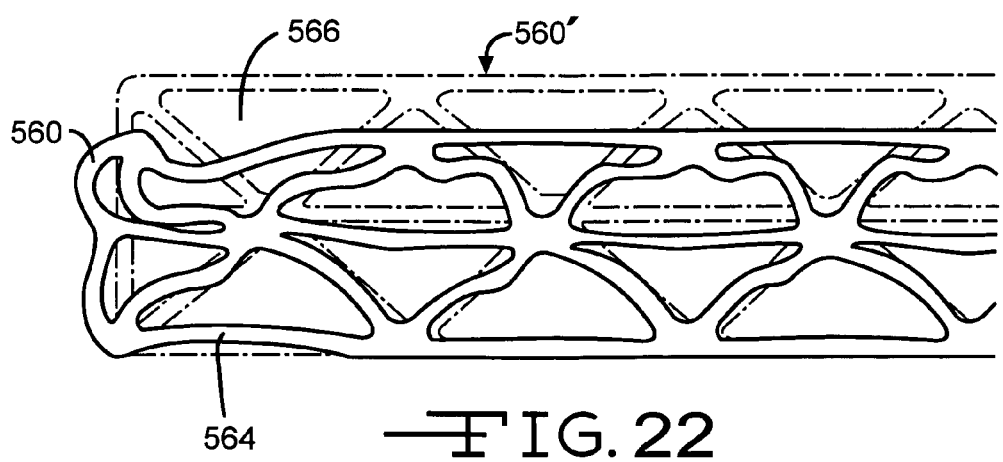
FIG. 22 is a schematic illustration of a cross-sectional view of an alternative embodiment of a hyperelastic member useful in the impact attenuator system shown under a compression stressed, yet resilient, state.

FIG. 22 is a schematic illustration of an alternative embodiment of a hyperelastic member 560 showing the member 560 in a temporarily compressed state and showing the member in an uncompressed, or relaxed state, in phantom. The hyperelastic member 560 has a plurality of structural members 564 that define triangular openings 566. The structural sections 564 at least partially collapse into the openings 566 when the hyperelastic member 560 is under compression. Once the compressive force is removed, the hyperelastic member 560 reverts back to the embodiment 560' as shown in phantom.

The impact attenuator system 10 further includes first and second anchoring systems 70a and 70b. For ease of illustration it should be understood that each anchoring systems 70a and 70b can have the same features, and that only one anchoring system 70 will be discussed in detail for ease of explanation. In the embodiment shown, the anchoring system 70 includes upper and lower cables 72 and 74 which are secured at their first ends 71 and 73, respectively, to a first, or front, anchoring mechanism 76 such as a loop or other device. In the embodiment shown, the upper and lower cables 72 and 74 are secured at their second ends 75 and 77, respectively, to second, or rear, anchoring mechanisms 80. In other embodiments, the anchoring system 70 can comprise fewer or more cables. The front anchoring mechanism 76 is securely anchored to the ground (not shown) in a suitable manner at or below ground level in front of the impact attenuator system 10. As best seen in the embodiment shown in FIG. 4, the lower cable 74 extends through a lower cable guide opening 82 in each of the upright members 32 in each of the diaphragm panels 30. In the embodiment shown, the lower cable 74 in extends in a rearward direction at approximately three inches above ground and is attached to an anchor system (not shown) at cable height in the rear of the impact attenuator system 10.

The upper cable 72 extends through an upper cable guide opening 84 in each of the upright members 32 in each of the diaphragm panels 30. In the embodiment shown, the first diaphragm panel 30a has its upper cable guide opening 84a at a spaced apart first distance from the lower cable guide opening 82a; the second diaphragm panel 30b has its upper cable guide opening 84b at a spaced apart second distance from the lower cable guide opening 82b. The first distance is less than the second distance such that the upper cable 72 is first guided in an upward direction from the front anchoring mechanism 76 and is guided in an upward direction from the first diaphragm panel 30a to the second diaphragm panel 30b. Thereafter, the upper cable 72 extends from the second diaphragm panel 30b through the diaphragm panels 30c–30e in a rearward direction that is substantially parallel to the lower cable 74. Both the upper cable 72 and the lower cable 74 are anchored at the second anchoring mechanism 80. In the embodiment shown, the portion of the upper cable 72 that extends through the diaphragm panels 30c–30e is about fifteen inches above ground level.

Figure 6:
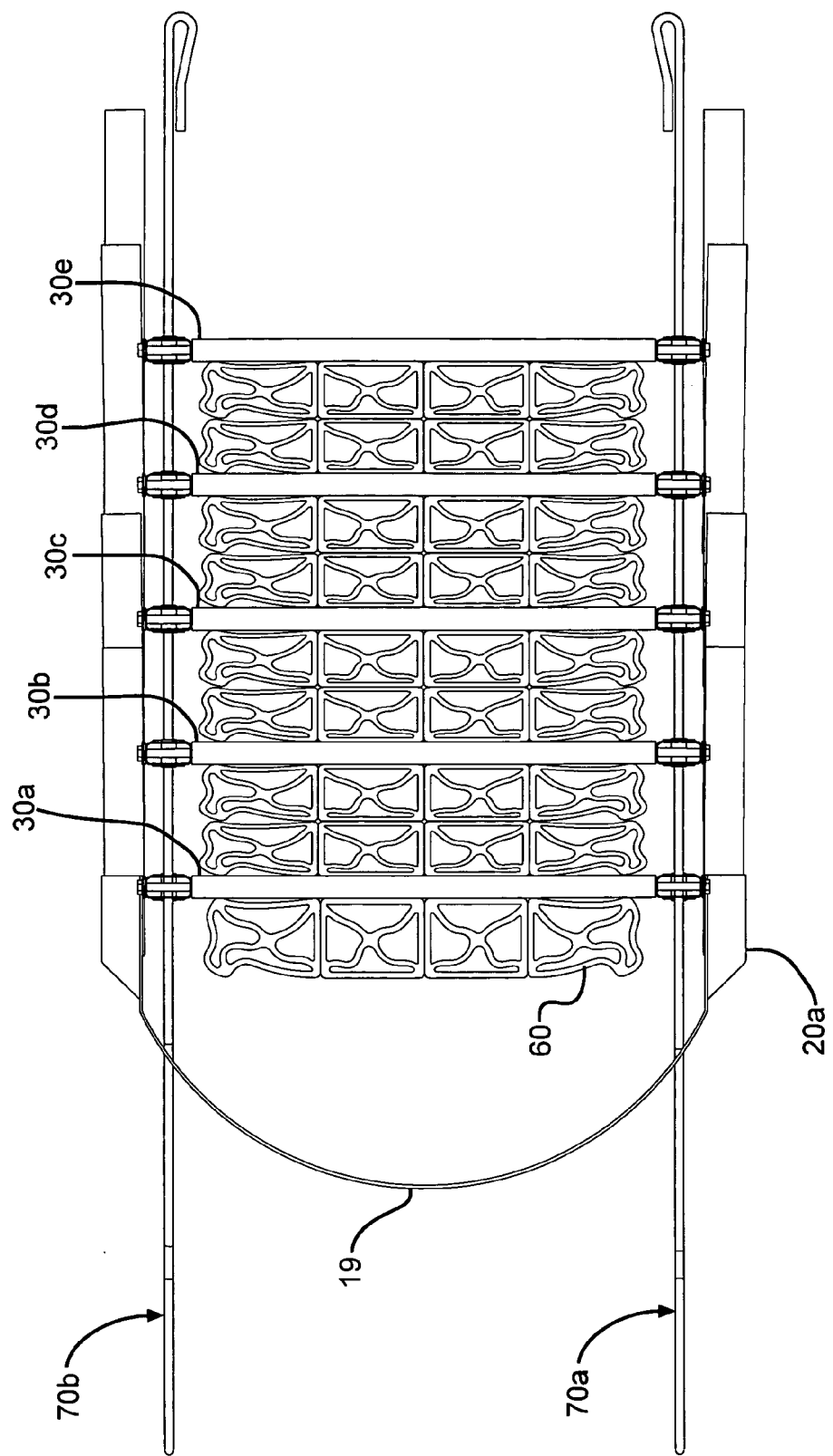
FIG. 6 is a schematic illustration, in plan view, of the embodiment of the impact attenuator system shown in FIG. 1 in a compressed state.
Figure 7:
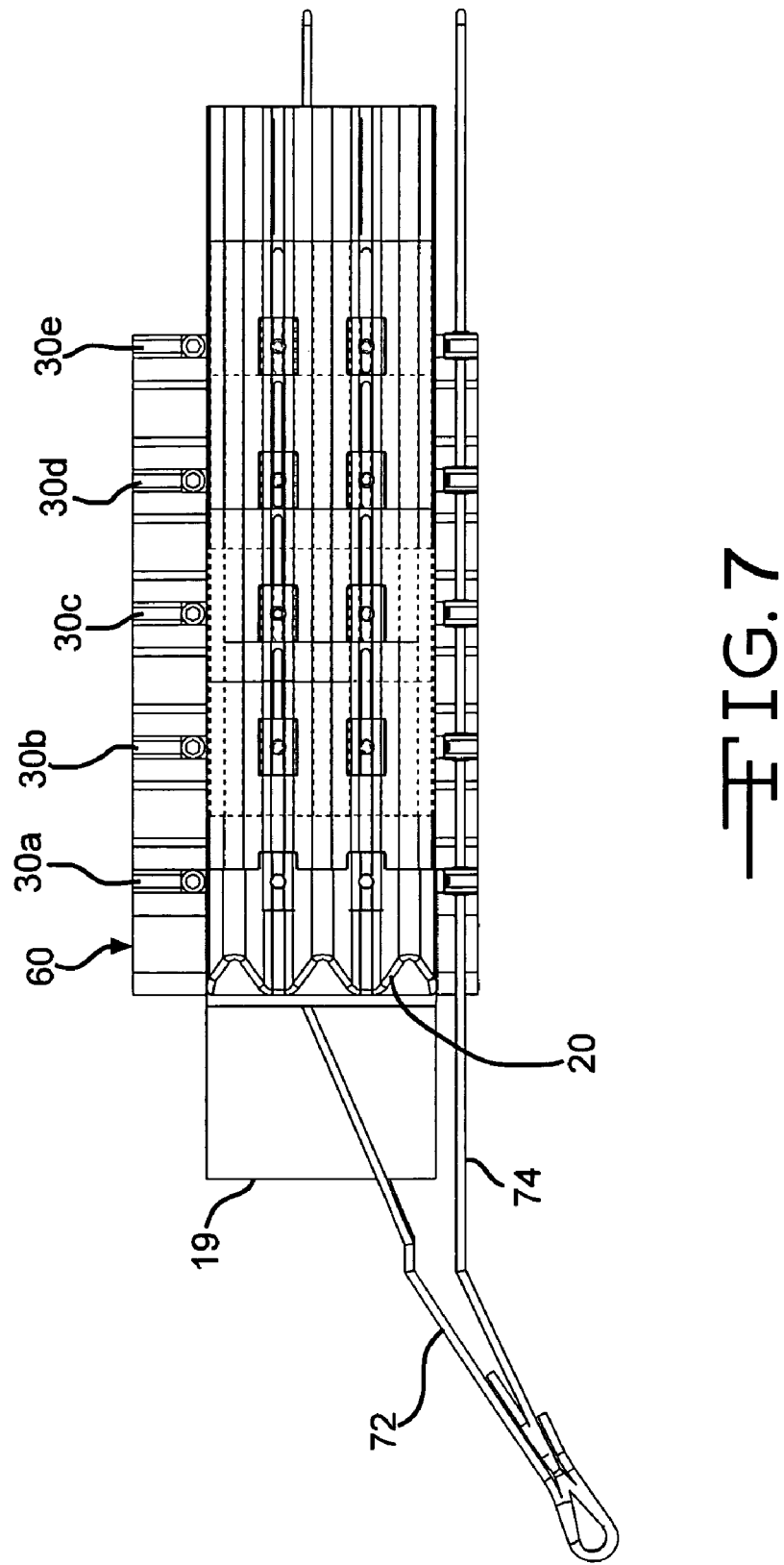
FIG. 7 is a schematic illustration, in side elevation view, of the embodiment shown in FIG. 2, in a compressed state.

In an end-on impact where a vehicle first impacts the nose assembly 19, as schematically shown in FIGS. 6 and 7, the impact attenuator system 10 deforms by having the sets of nested side panels 20a–20a'–20e–20e' telescope onto adjacent side panels; that is, the side panels 20a–20a' through at least one set of the adjacent side panels 20b–20b' to 20e–20e' are moved by the impacting vehicle, allowing the impact attenuator system 10 to deflect in the longitudinal direction. Since each set of side panels 20a–20a'–20e–20e' is connected to the corresponding diaphragm panel 30a–e by the plurality of individual securing mechanisms 40 that are positioned in the corresponding slots 26, the first set of side panels 20a–20a' is slidingly moved along the slots 26 in the second set of side panels 20b–20b', and so on. The distance the sets of side panels are rearwardly displaced and the number of set of side panels that are rearwardly displaced depends on the impact on the impact attenuator system 10. This telescoping feature of the impact attenuator system 10 of the present invention is intended to safely bring to a stop a vehicle that strikes the system 10 on its end and to subsequently return the system 10 to its original position. The number of bays 50, the number of hyperelastic elements 60 per bay, and the geometry of the hyperelastic elements 60 can be readily modified to accommodate specific applications of the system 10 depending on expected range impact energies. For example, the configuration of hyperelastic elements 60 and the number of bays 50 shown in FIG. 1 will safely stop a 3400-lb car impacting at a speed of 50 mph in a head-on impact. The maximum 10 ms average ridedown acceleration in this case is approximately 25–30 g's, which is a 70–75% reduction of the impact force compared to a frontal impact of the vehicle into a rigid wall at 50 mph.

The impact attenuator system 10 of the present invention also has the ability to redirect vehicles that impact on the side of the system 10. To accommodate such side impacts, while not compromising the performance of the system in end-on impacts, the side panels 20 are preferably composed of short sections of overlapping steel or HDPE panels which distribute the impact forces between each bay 50 of the system during side impacts. During impacts on the side of the system 10, the impact forces are distributed from the side panels 20 through the diaphragms 30 to the cables 72 and 74, which act in tension to transfer the impacting load to the anchors, thereby allowing the system to safely redirect the vehicle away from the hazard.

Referring now to FIGS. 8–18 another embodiment of an impact attenuator system 110 is shown which can be secured in a different manner. The impact attenuator system 110 includes a first side beam assembly 112 and an opposing, or second, side beam assembly 114. The first and second beam assemblies 112 and 114 are in parallel and opposed relationship. The first beam assembly 112 has a first, or leading, end 115 and a second end 116. Likewise, the second beam assembly 114 has a first, or leading, end 117 and a second end 118.

The impact attenuator system 110 also includes a nose assembly 119 that is secured in a suitable manner to the first end 115 of the first beam assembly 112 and to the first end 117 of the second beam assembly 114.

Figure 10:
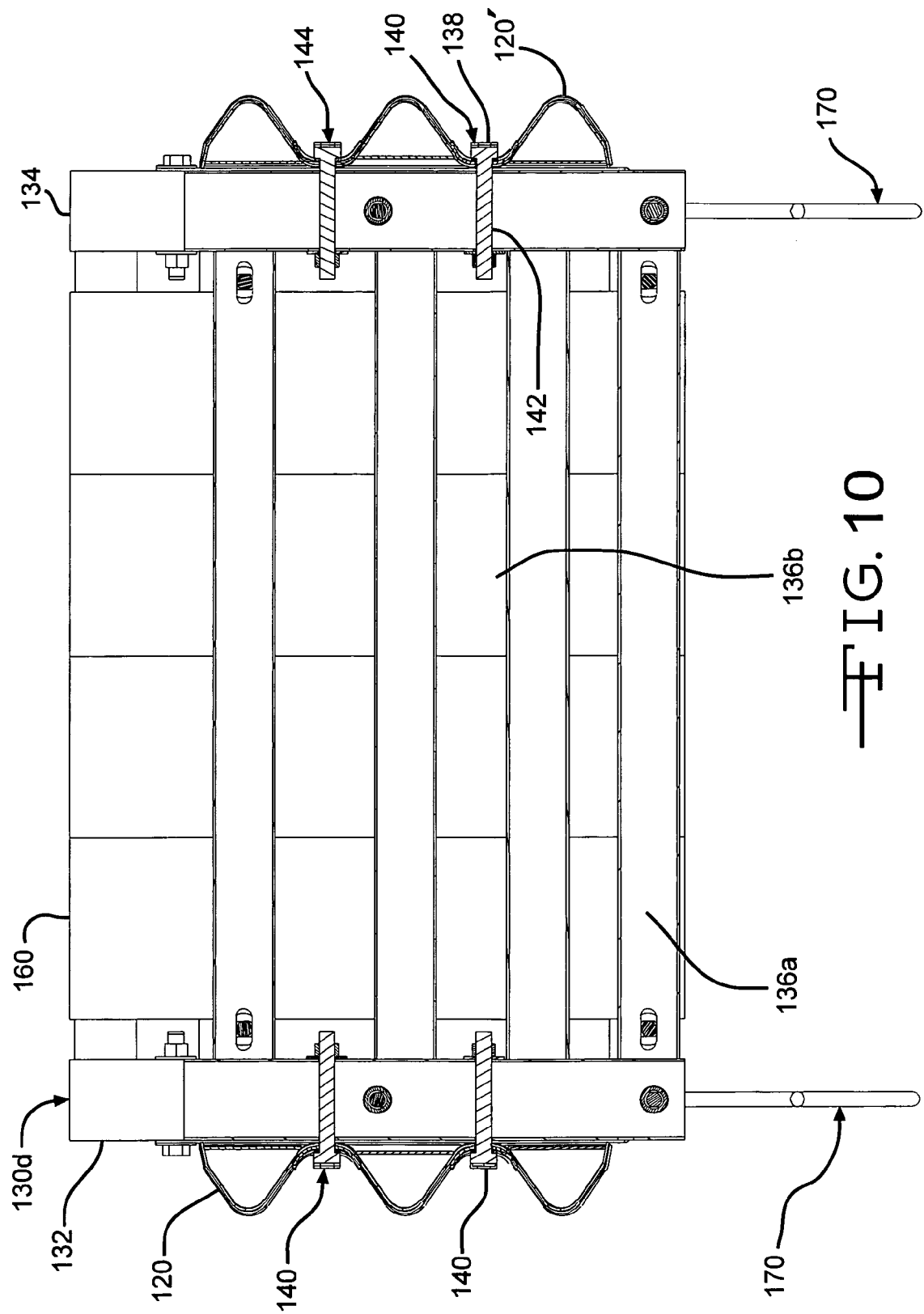
FIG. 10 is a schematic illustration, in an end elevational view, as taken along the line 9—9 in FIG. 8.
Figure 11:
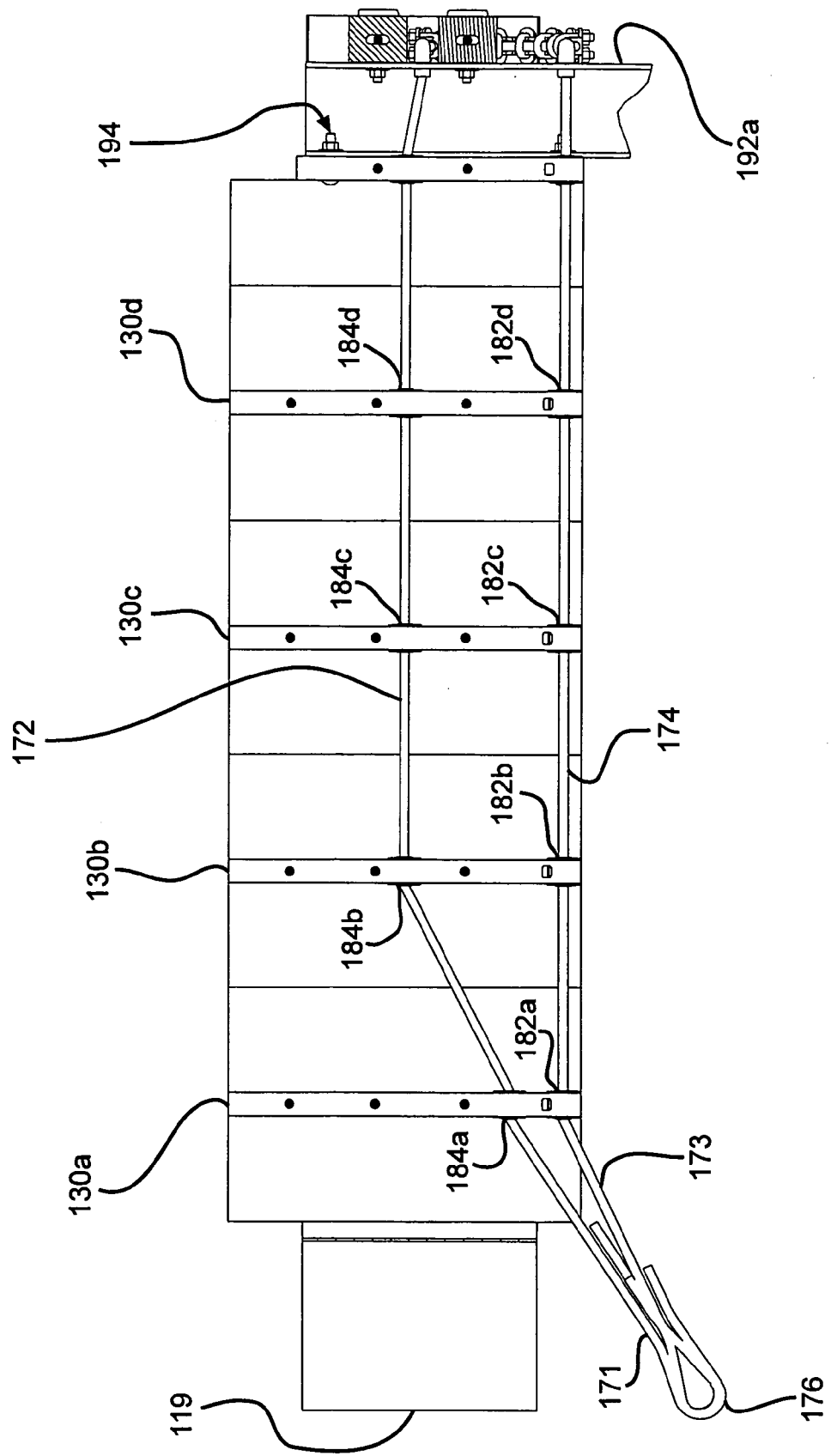
FIG. 11 is a schematic illustration, in side elevation, taken along the line 11—11 in FIG. 8.
Figure 12:
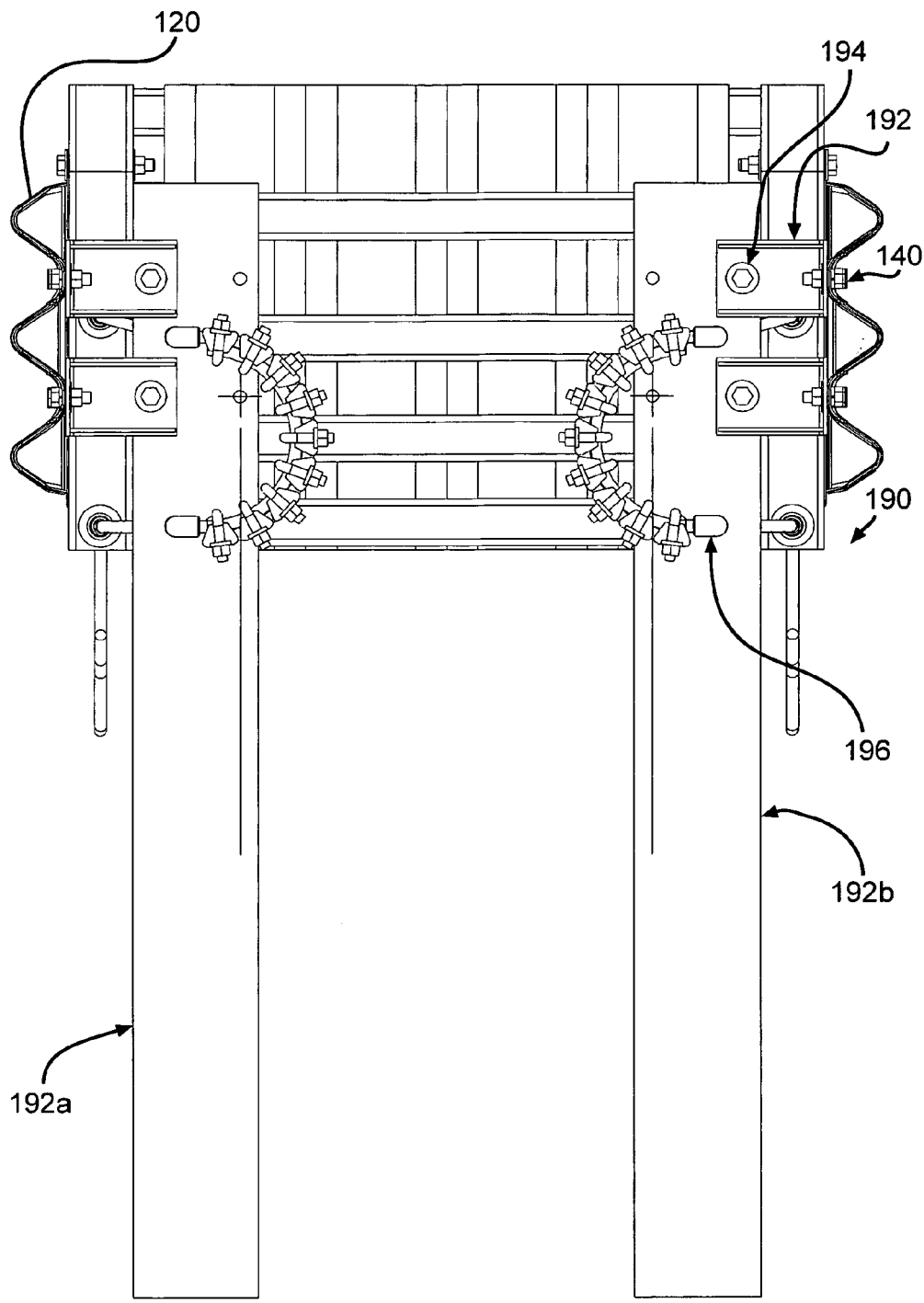
FIG. 12 is a schematic illustration, in an end elevational view, as taken along the line 12—12 in FIG. 9.

Each side beam assembly 112 and 114 further includes a plurality of side panels generally shown here as 120a, 120b, 120c, 120d and 120e. For ease of illustration it should be understood that each side beam assembly 112 and 114 have similar side panel members where the side panels that comprise the side beam assembly 112 are designated as 120a–120e and the side panels that comprise the side beam assembly 114 are designated as 120'a–120e'; only one side will be discussed in detail for ease of explanation. The first side panel 120a has a first end 122a and a second end 124a; likewise each subsequent panel 120b, etc. has first ends 122b, etc., and second ends 124b, etc. The second end 124a overlaps the first end 122b of the adjacent panel 120b. Likewise, each adjacent panel has overlapping first and second ends. The side panel members 120a–120e are in a nested linear arrangement. The side panel members 120a'–120e' are also in a nested linear arrangement. Each side panel 120 can have a three-dimensional shape, such as a wave, or corrugated, shape, as shown in FIGS. 10 and 12.

It should be understood that the side panels 20 can have other suitable dimensions, as will become apparent from the following description.

Each side panel 120 generally defines at least one longitudinally extending opening 126. As best seen in the embodiment shown in FIG. 9, each side panel 120 has an upper longitudinally extending opening, or slot, 126*a* and a lower longitudinally extending opening, or slot, 126*b* that are in parallel relationship. The slot 126*a* on the side panel 120*a* at least partially overlaps the adjacent slot 126*a* on the adjacent side panel 120*b*; likewise, each adjacent side panel has overlapping slots 126.

The impact attenuator system 110 further includes a plurality of diaphragm panels generally shown here as 130*a*, 130*b*, 130*c*, 130*d* and 130*e*. In this embodiment, the last diaphragm panel is designated as 130*e*. It should be understood, however, that the impact attenuator system 110 can have a different number of diaphragm panels; for consistency in explanation, the last diaphragm panel will designated herein as 130*e*.

Figure 8:
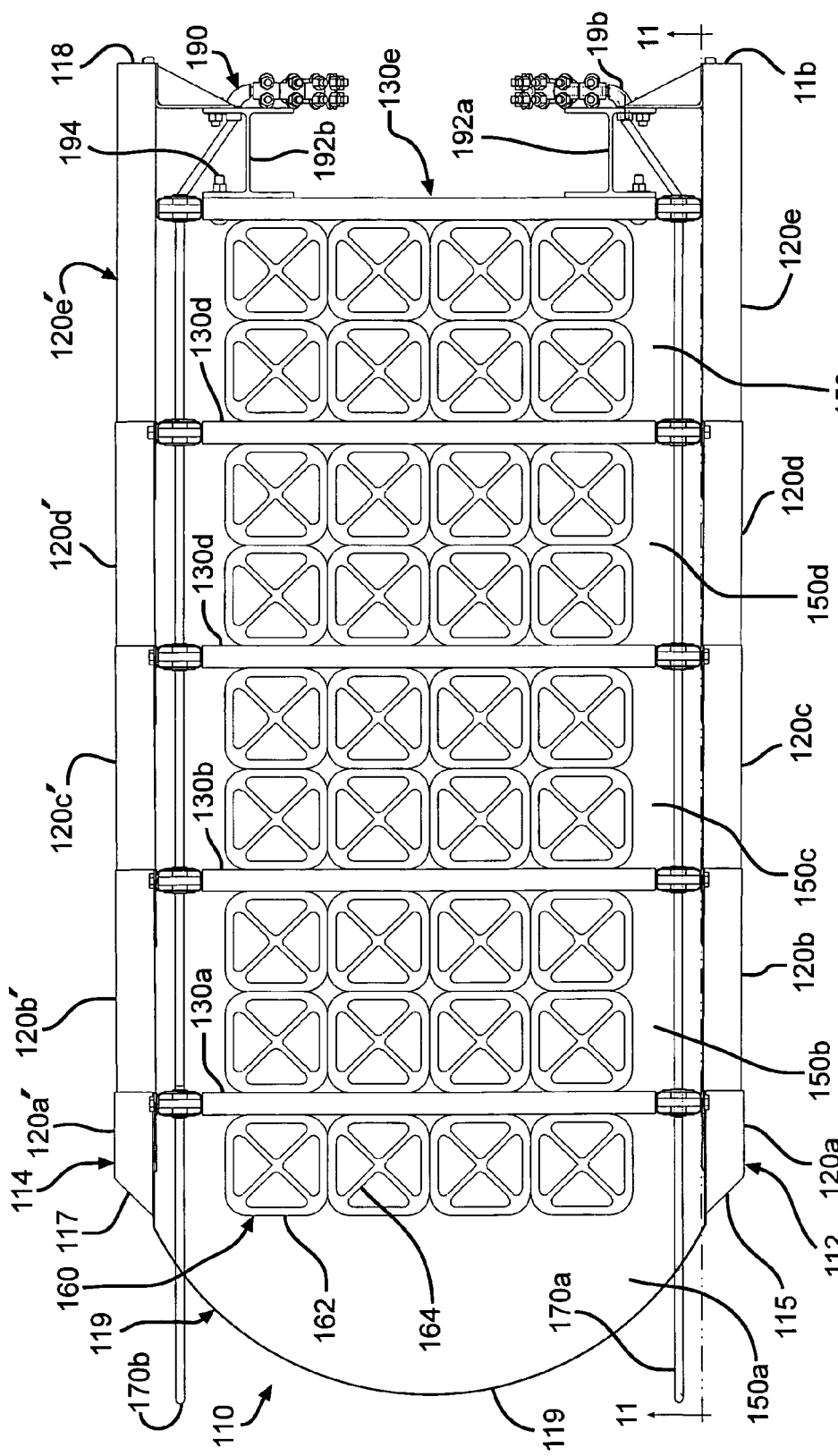
FIG. 8 is a schematic illustration, in plan view, of another embodiment of an impact attenuator system.
Figure 9:
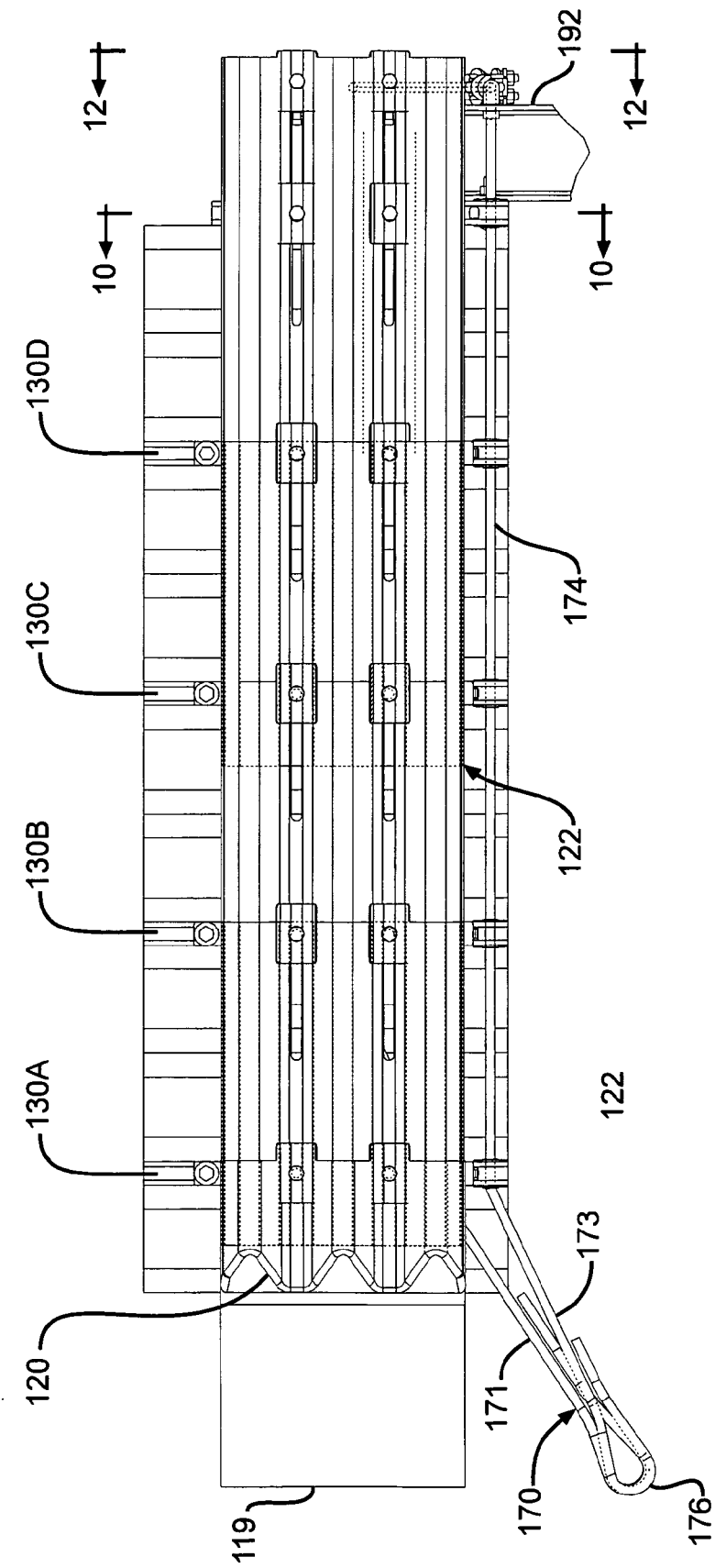
FIG. 9 is a schematic illustration, in side elevation view, of the embodiment shown in FIG. 8.

As best seen in FIGS. 8 and 19, the last diaphragm panel 130*e* generally has a length that is shorter than the forwardly placed diaphragm panels. For ease of illustration it should be understood that each remaining diaphragm panel 130*a*–130*d* can have the same features, and that only one diaphragm panel will be discussed in detail for ease of explanation.

As best seen in FIG. 10, each of the diaphragm panels 130 can be comprised of first and second upright members 132 and 134 and at least one or more cross members, generally shown as 136*a*, 136*b*, 136*c*, 136*d* and 136*e*, which extend between the first and second upright members 132 and 134. The first and second upright members include a plurality of spaced apart openings 138. Each opening 138 can receive a securing mechanism 140. In other embodiments, the diaphragm panel 130 can have other configurations for the cross members 136, such as formed into an X shape (not shown) or other suitable configuration.

The first diaphragm panel 130*a* is positioned between opposing side panels 120*a* and 120*a*' at substantially a right angle. The first diaphragm panel 130*a* is secured to the opposing side panels 120*a* and 120*a*' by one of the securing mechanisms 140. The securing mechanism 140 can comprise at least one screw-type member 142 that can have a head that is wider than the width of the slot 126; alternatively the securing mechanism 140 can include at least one washer-type member 144 that axially fits over the screw-type member 142 such that the washer-type member has length and width dimensions that are greater than the width of the slot 126. The screw-type member 142 extends from the outer surface of the side panel 120 through the slot 126, through the adjacent opening 138 in the upright member 132 (or 134) of the diaphragm panel 130, and is held in position with a suitable locking member 146, such as a hex nut. It is to be understood that the securing mechanism 140 is capable of being longitudinally moved along the slot 126, as will be more fully explained below.

As at least partially assembled, the impact attenuator system 110 includes a plurality of opposing side panels 120*a*–120*e* and 120*a*'–120*e*' and a plurality of diaphragm panels 130*a*–130*e*. As assembled, the first opposing side panels 120*a* and 120*a*' are secured to the first diaphragm panel 130*a*. That is, the first upright member 132 of the diaphragm panel 130 is secured to the first side panel 120*a* and the second upright member 124 of the diaphragm panel 130*a* is secured to the first opposing side panel 120*a*' by having securing mechanisms 140 extend through the slots 126 in the side panels 120 and through the adjacent opening 138 in the upright member 132 (or 134). Likewise, the remaining side panels are secured to the remaining diaphragm panels.

The impact attenuator system 110 thus defines a plurality of bays 150*a*–150*e*. Each bay 150 is defined by the opposing side panels 120 and diaphragm panels 130. As best seen in FIG. 8, the bay 150*a* is defined by the opposing side panels 120*a* and 120*a*' and by the diaphragm panel 130*a* and the nose assembly 119. Likewise, the remaining bays 150*b*–150*e* are defined by corresponding side panels and diaphragm panels. It is to be understood that the impact attenuator system 110 can include fewer or more side panels and diaphragm panels, and that the numbers and dimensions of such side panels and diaphragm panels will depend, at least in part, on the end use and the object which is being protected.

The impact attenuator system 110 includes a plurality, or array, of hyperelastic members 160. In the embodiment shown, each hyperelastic member 160 has a substantially tubular or columnar shaped sidewalls 162 and at least one interior structural member 164. In the embodiment shown, the structural member generally has an X-shaped cross-section. It is to be understood that the hyperelastic members 160 can have specific shapes and dimensions that best meet the end use requirements. For example, in one embodiment, as shown in the figures herein, the hyperelastic members 160 have a generally square pillar conformation and have an x-shaped structural cross-section 164 which allows each hyperelastic member 160 to most effectively absorb impact energies, as will be further explained below.

The impact attenuator system 110 further includes first and second anchoring systems 170*a* and 170*b*. For ease of illustration it should be understood that each anchoring systems 170*a* and 170*b* can have the same features, and that only one anchoring system 170 will be discussed in detail for ease of explanation. In the embodiment shown, the anchoring system 170 includes upper and lower cables 172 and 174 which are secured at their first ends 171 and 173, respectively, to a first, or front, anchoring mechanism 176 such as a loop or other device. In the embodiment shown, the upper and lower cables 172 and 174 are secured at their second ends 175 is and 177, respectively, to a second, or rear, anchoring mechanism 190.

The rear anchoring mechanism 190 includes a pair of spaced apart and parallel support members 192*a* and 192*b*, such as I-beams. The shorter last diaphragm panel 130*e* is connected to the support members 192*a* and 192*b* by at least one or more suitable connecting means 194 such as mounting brackets. The second end 175 of the upper cable 172 is secured to the support member 192. The second end 177 of the lower cable 174 is also secured to the support member 192. The rear anchoring mechanism 190 further includes a first elbow-cable guard 196*a* mounted on the first I beam support member 192*a* and a second elbow cable guard 196*b* mounted on the second I beam support member 192*b*. The side beam panels 20 are structural members with sufficient height to shield the interior components of the system from direct impact from a vehicle and provide adequate strength to transfer load to the diaphragms 30 when impacted at any point on the face of the panels. The materials that the panels may be constructed from include, but are not limited to, High Density Polyethylene, steel, aluminum, plastic, fiber reinforced plastic and various composite materials. In certain embodiments, it is preferred that the material be recoverable, or semi-recoverable, produce no, or very little, debris when impacted by a vehicle, and can withstand multiple vehicle impacts before needing to be replaced. In the embodiment shown, the side panels are made from corrugated sheet steel (e.g., 10-gauge thrie-beam).

It is to be understood that, in other embodiments, the anchoring system 170 can comprise fewer or more cables. The front anchoring mechanism 176 is securely anchored to the ground (not shown) in a suitable manner at or below ground level in front of the impact attenuator system 10. As best seen in the embodiment shown in FIG. 11, the lower cable 174 extends through a lower cable guide opening 178 in each of the upright members 132 in each of the diaphragm panels 130. In the embodiment shown, the lower cable 174 in extends in a rearward direction at approximately three inches above ground and is attached to an anchor system (not shown) at cable height in the rear of the impact attenuator system 110.

The upper cable 172 extends through an upper cable guide opening 184 in each of the upright members 132 in each of the diaphragm panels 130. In the embodiment shown, the first diaphragm panel 130a has its upper cable guide opening 184a at a spaced apart first distance from the lower cable guide opening 182a; the second diaphragm panel 130b has its upper cable guide opening 184b at a spaced apart second distance from the lower cable guide opening 182b. The first distance is less than the second distance such that the upper cable 172 is first guided in an upward direction from the front anchoring mechanism 176 and is guided in an upward direction from the first diaphragm panel 130a to the second diaphragm panel 130b. Thereafter, the upper cable 172 extends from the second diaphragm panel 130b through the diaphragm panels 130c–130e in a rearward direction that is substantially parallel to the lower cable 174. Both the upper cable 172 and the lower cable 174 are anchored at the second anchoring mechanism 190. In the embodiment shown, the portion of the upper cable 172 that extends through the diaphragm panels 130c–130e is about fifteen inches above ground level.

Figure 13:
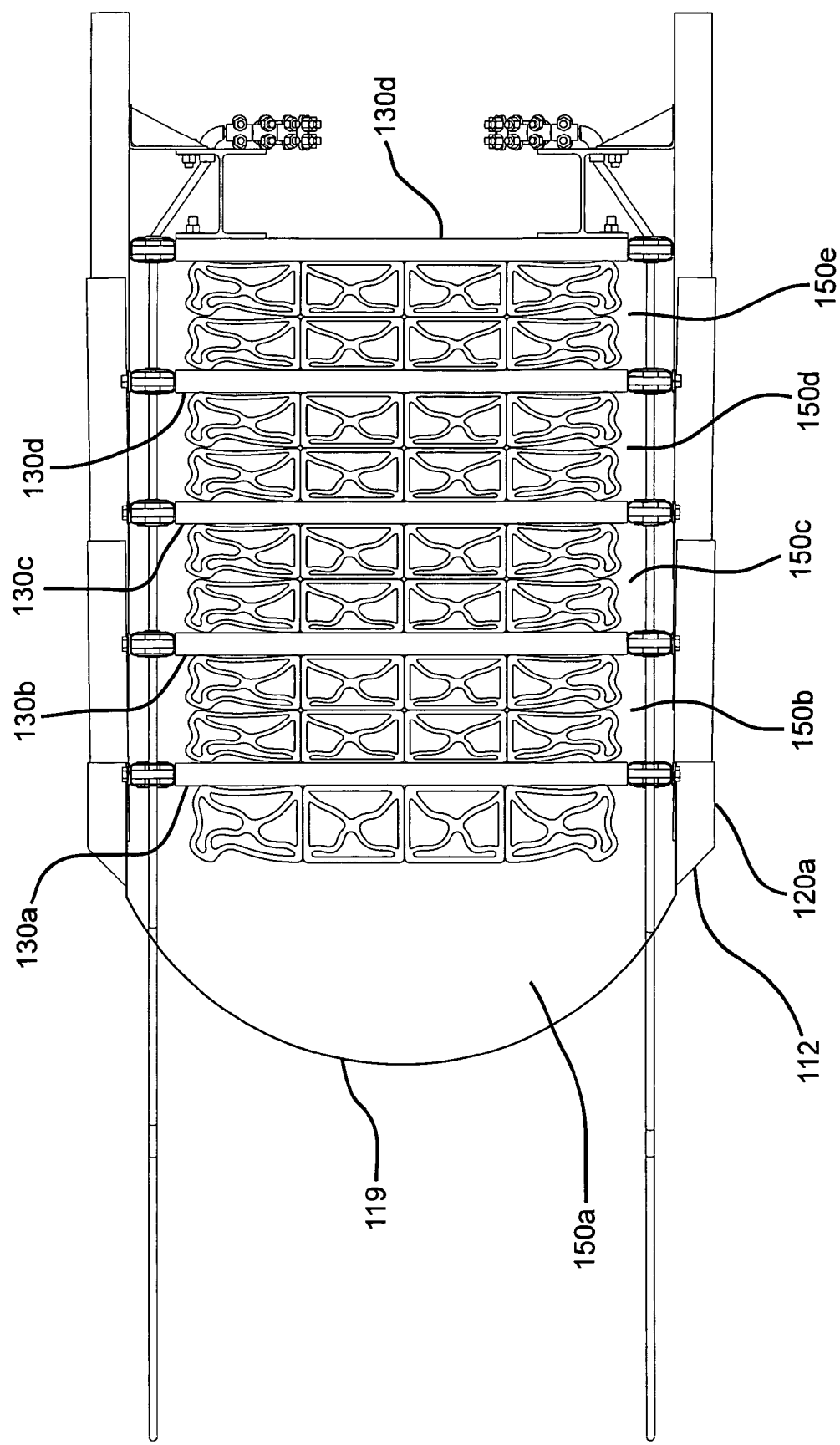
FIG. 13 is a schematic illustration, in plan view, of the embodiment of the impact attenuator system shown in FIG. 8 in a compressed state.
Figure 14:
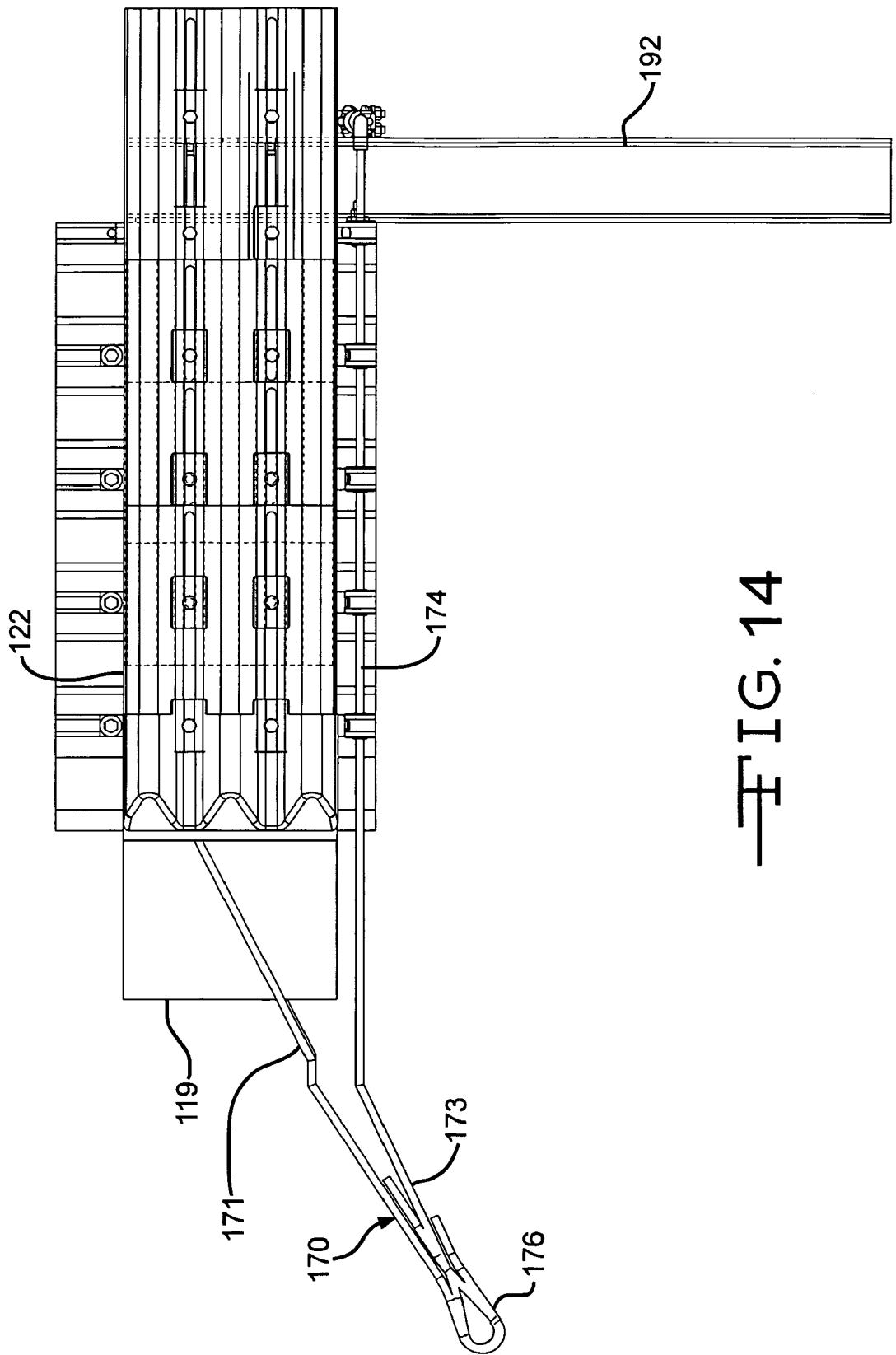
FIG. 14 is a schematic illustration, in side elevation view, of the embodiment shown in FIG. 9, in a compressed state.

In an end-on impact where a vehicle first impacts the nose assembly 119, as schematically shown in FIGS. 12–14, the impact attenuator system 110 deforms by having the sets of nested side panels 120a–120a'–120e–120e' telescope onto adjacent side panels; that is, the side panels 120a–120a' through at least one set of the adjacent side panels 120b–120b' to 120e–120e' are moved by the impacting vehicle, allowing the impact attenuator system 110 to deflect in the longitudinal direction. Since each set of side panels 120a–120a'–120e–120e' is connected to the corresponding diaphragm panel 130a–e by the plurality of individual securing mechanisms 140 that are positioned in the corresponding slots 126, the first set of side panels 120a–120a' is slidingly moved along the slots 126 in the second set of side panels 120b–120b', and so on. The distance the sets of side panels are rearwardly displaced and the number of set of side panels that are rearwardly displaced depends on the impact on the impact attenuator system 110.

This telescoping feature of the impact attenuator system 110 of the present invention is intended to safely bring to a stop a vehicle that strikes the system 110 on its end and to subsequently return the system 110 to its original position. The number of bays 150, the number of hyperelastic elements 160 per bay, and the geometry of the hyperelastic elements 160 can be readily modified to accommodate specific applications of the system 110 depending on expected range impact energies. For example, the configuration of hyperelastic elements 160 and the number of bays 150 shown in FIG. 8 will safely stop a 3400-lb car impacting at a speed of 50 mph in a head-on impact. The maximum 10 ms average ridedown acceleration in this case is approximately 25–30 g's, which is a 70–75% reduction of the impact force compared to a frontal impact of the vehicle into a rigid wall at 50 mph.

The impact attenuator system 110 of the present invention also has the ability to redirect vehicles that impact on the side of the system 110. To accommodate such side impacts, while not compromising the performance of the system in end-on impacts, the side panels 120 are preferably composed of short sections of overlapping steel or HDPE panels which distribute the impact forces between each bay 150 of the system during side impacts. During impacts on the side of the system 110, the impact forces are distributed from the side panels 120 through the diaphragms 130 to the cables 172 and 174, which act in tension to transfer the impacting load to the anchors, thereby allowing the system to safely redirect the vehicle away from the hazard.

In certain embodiments the side beam assemblies form a rigid U-shaped structure which preferably is made of a composite material, including for example, metals such as steel, and plastics such as high density polyethylene. The composite material is recoverable, or semi-recoverable, produces no, or very little, debris when impacted by a vehicle, and can withstand multiple vehicle impacts before needing to be replaced. The hyperelastic elements crush in the direction of impact which is the primary energy dissipating mechanism. Because of the geometry of the hyperelastic elements shown in the current embodiment, the hyperelastic elements also spread outward as they crush.

In another aspect, the invention is directed to a composition and process for forming hyperelastic elements.

The hyperelastic material used herein is a novel energy absorbing material that behaves in a rate-independent hyperelastic manner. The hyperelastic material behaves in a manner such that its permanent set is minimized so that the energy absorbing material maintains consistent force-displacement characteristics over a wide range of impact velocities while remaining fully recoverable.

The hyperelastic material behaves in a hyperelastic manner under dynamic loadings of high strain rates of up to at least about $900-1000s^{-1}$. The hyperelastic material uniquely allows for direct impacts and also allows for the instantaneous recovery of the components from which the material is made. The hyperelastic material has non-linear elastic responses in energy absorbing applications.

It is to be understood that the hyperelastic material is especially suitable for use in various impact attenuating environments and products. As such, it is within the contemplated scope of the present invention that a wide variety of other types of products can be made using the hyperelastic materials of the present invention. Examples of such products include, but are not limited to, protective gear for work and sports, including helmets and pads, car seats, pedestal seats on helicopters, bumpers for loading docks, and the like.

It is to be understood that elastomers belong to a specific class of polymeric materials where their uniqueness is their ability to deform to at least twice their original length under load and then to return to near their original configuration upon removal of the load. Elastomers are isotropic, nearly incompressible materials which behave as linear elastic solids under low strains and low strain rates. As these materials are subjected to larger strains under quasistatic loading, they behave in a non-liner manner. This unique mechanical behavior is called hyperelasticity. Hyperelastic material have the ability to do work by absorbing kinetic energy transferred from impact through an elastic deformation with little viscous damping, heat dissipation (from friction forces) or permanent deformation (i.e., permanent set). This mechanical energy can then be returned nearly 100% allowing the components to return to their original configuration prior to impact with negligible strain.

Unfortunately, an added complexity to elastomers is their strain rate and strain history dependence under dynamic loading, which is called viscoelasticity. The viscoelastic nature of elastomers causes problems resulting in hysteresis, relaxation, creep and permanent set. Permanent set is when elastomers undergo a permanent deformation where the material does not return to zero strain at zero stress. This deformation however, tends to stabilize upon repeated straining to the same fixed strain. To further add to the complexity of the mechanical behavior of elastomers is the visco-hyperelastic response at high strain under dynamic loading, which is difficult to characterize and test. Often stress-strain data from several modes of simple deformation (i.e., tension, compression and shear) are required as input to material models, which predict their performance.

Thus, in one aspect, the present invention uses hyperelastic materials that absorb great amounts of mechanical energy while maintaining full recoverability. Traditionally, the viscous component of rubbers dominates under dynamic loading; whereby the strain rate dependence is accounted for by visco-hyperelastic models, where the static response is represented by a hyperelastic model (based on elastic strain energy potential) in parallel with a Maxwell model which takes into account strain rate and strain history dependent viscoelasticity.

In yet another specific aspect, the present invention relates to an energy absorbing hyperelastic material which comprises a mixture of reactive components comprising an MDI-polyester and/or an MDI-polyether prepolymer, at least one long-chain polyester and/or polyether polyol, at least one short-chain diol, and at least one catalyst. The hyperelastic material behaves in a rate-independent hyperelastic manner and has a permanent set that is minimized so that the hyperelastic material absorbs tremendous amounts of impact energy while remaining fully recoverable when used in energy-absorbing applications. In certain embodiments the reactive components are combined in a proportion that provides about 1–10% excess of isocyanate groups in the total mixture.

Polyurethane elastomers are a class of materials known to possess hyperelastic behavior. Of particular interest to the current invention are polyurethane cast elastomer systems comprised of an isocyanate component, typically methylene diphenyl diisocyanate (MDI), a long chain polyol comprised of a 1000–2000 MW polyester- or polyether-based hydroxyl-terminated polyol, and a short chain glycol (e.g., 1,4-butanediol). Such systems are generally mixed with a slight excess of isocyanate groups which are available to undergo further reaction during the cure and postcure cycle. These reactions result in a fully cured polymer system which is slightly crosslinked and thus exhibits a high degree of recoverability subsequent to deformation. With appropriate choice of components, proper and unique material properties and impact response can be achieved which make these polymer materials suitable for hyperelastic elements in the impact attenuator barrier system described in the current invention. The preferred hyperelastic material has the following characteristics: Shore A hardness values of about 90, Maximum tensile stress ranging from about 4000 to about 7000 psi, Elongation at break ranging from about 500 to about 700%, and Young's modulus ranging from about 4000 to about 6000 psi. The hyperelastic materials useful to form the hyperelastic elements can be formed by combining a full MDI prepolymer system containing a long-chain polyester and/or polyether polyol, which requires addition of a short chain glycol as a curative, and a catalyst using a standard mixing/metering machine. The full MDI prepolymer typically has a low % NCO, ranging from between about 5 to 10% free isocyanate groups, Alternatively, the hyperelastic elements can be formed by combining a quasi MDI prepolymer system containing a long-chain polyester and/or polyether polyol, which requires the addition of both a short chain glycol and a long chain polyester and/or polyether polyol. Suitable polyester polyols can include, without limitation, polyglycol adipates, such as ethylene/butylene adipate, or polycaprolactones. Suitable polyether polyols can include, without limitation, polypropylene glycol, polyethylene glycol, or combinations thereof.

The quasi MDI prepolymer typically has a higher % NCO, ranging from between about 10 to 25% free isocyanate groups. The MDI prepolymer therefore can be cured with a short chain glycol with addition, as necessary, of a long chain polyol component, in order to achieve the desired material stiffness and response at the impact condition.

The composition of the hyperelastic elements, when used as a component in the impact attenuator barrier system described herein, produces desired G-force reduction and recoverability in actual impact tests. The prepolymer can be an MDI-polyester and/or polyether prepolymer having a free isocyanate content of about 5 to 25%, and preferably about 19%. Suitable polyesters that can be used with the MDI isocyanate component include, without limitation, polyglycol adipates, such as ethylene/butylene adipate, or polycaprolactones. Suitable polyethers that can be used with the MDI isocyanate component can include, without limitation, polypropylene glycol, polyethylene glycol, or combinations thereof. The polyol can have an OH# of about 25 to 115, preferably about 35 to 80, and most preferably about 56. The short-chain diol can include, without limitation, 1,4-butanediol, and can account for about 10 to 20% by weight, preferably about 18% by weight of the total hydroxyl-containing components of the mixture.

Reactive components can be combined in a proportion that provides about 1 to 10%, preferably 5% excess of isocyanate groups in the total mixture. A catalyst package can be utilized which facilitates the chemical reaction of the components and allows demolding of the parts within a reasonable time frame. The gel time or work life of the system should not be shorter than the mold filling time to ensure uniform material properties throughout all sections of the part. The catalyst system can contain a blend of a tertiary amine catalyst and a tin-based catalyst. About a 1:1 to 10:1 weight ratio, preferably about a 4:1 weight ratio, of the amine component to the tin component will provide desirable processing characteristics. A total catalyst loading is performed such that the mold is filled entirely before the material begins gelling. This level of reactivity allows ample pour time and minimizes de-mold time during manufacture. In certain embodiments, the chemical reactivity can be adjusted by changing the amount of catalyst in the system.

The present invention also is directed to a process for manufacturing the hyperelastic elements. The process includes heating the components to process temperatures, degassing components to remove any dissolved or entrained gases, precisely metering components to a mix chamber, dynamically mixing the components, and dispensing mixed material into a mold from which the cured part is subsequently demolded and subjected to an appropriate post cure cycle. Due to differences in component melt points and viscosity, appropriate component temperatures, as well as mold temperatures, may range from approximately 100° F. to 250° F.

It should be understood that the examples and embodiments described herein are for illustrative purposes only and that various modifications or changes in light thereof will be suggested to persons skilled in the art and are to be included within the spirit and purview of this application.

EXAMPLE 1

Testing of the Hyperelastic Elements

A material for thermoset, cast polyurethane components for use in making the hyperelastic elements in the impact attenuator system was formulated. The material had a Young's modulus of at least about 4000 to about 6000 psi and provided optimized tensile and elongation properties at this stiffness. Samples were prepared from a formulation having the following physical properties: Young's modulus: 5933 psi; Tensile strength: 6830 psi; and Elongation: 638%.

Figure 15:
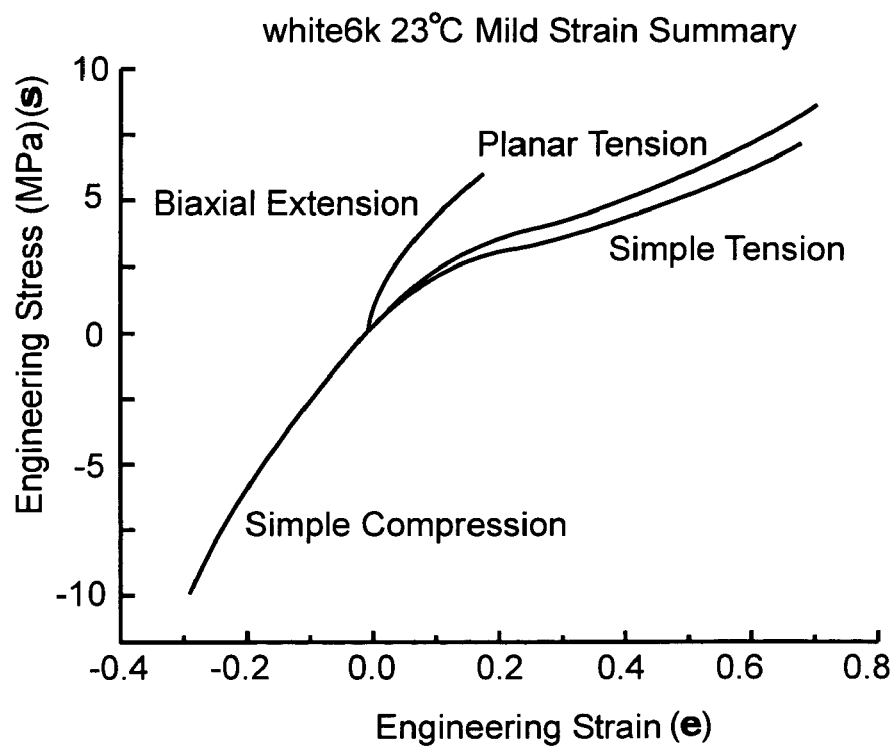
FIG. 15 is a graph showing the low-strain summary of hyperelastic mechanical properties at 23° C.
Figure 16:
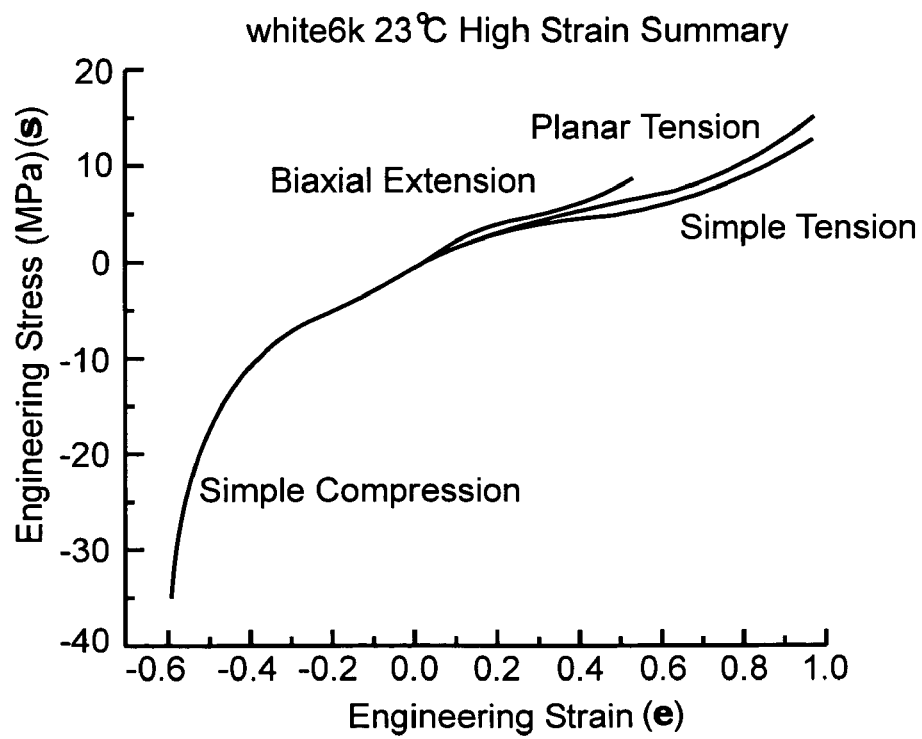
FIG. 16 is a graph showing the mid-strain summary of hyperelastic mechanical properties at 23° C.
Figure 17:
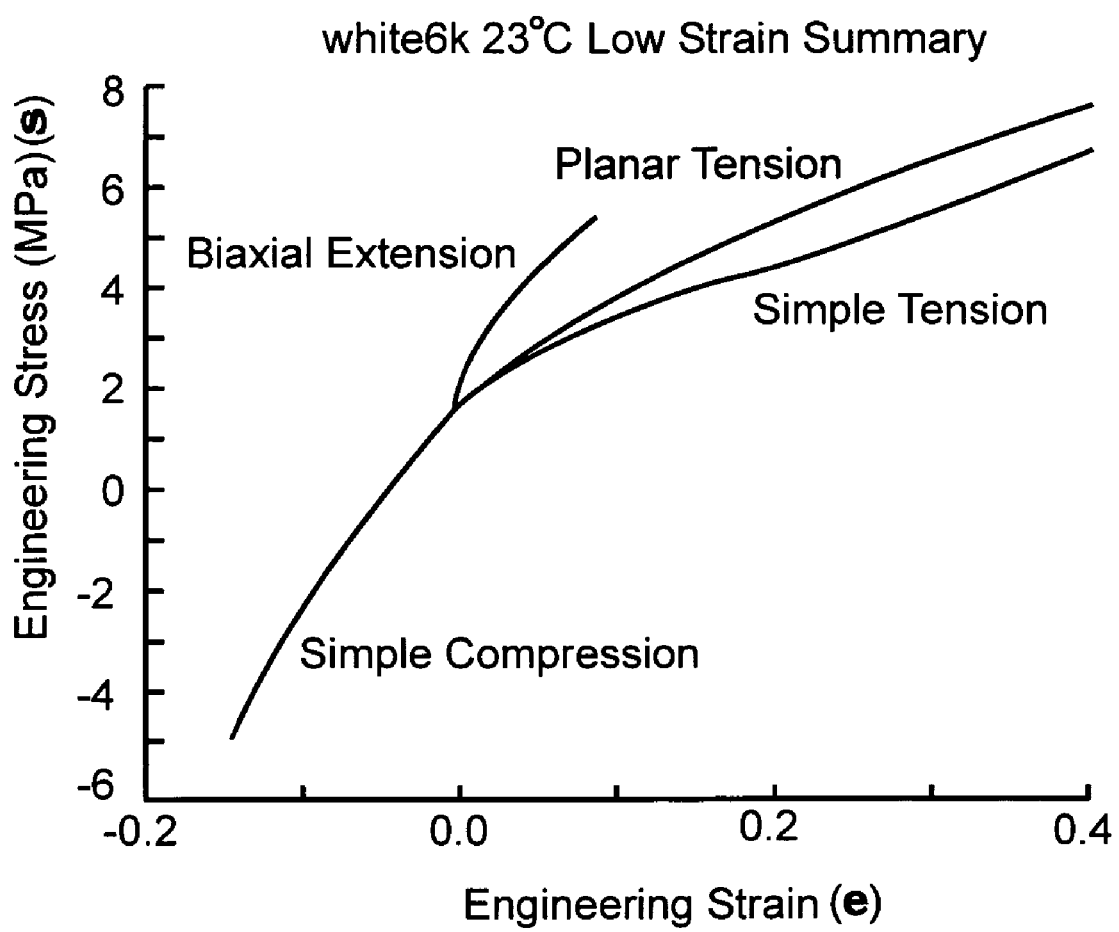
FIG. 17 is a graph showing the high-strain summary of hyperelastic mechanical properties at 23° C.

The samples were submitted for hyper-elastic testing. As seen in the FIGS. 15, 16 and 17, the test results proved satisfactory. FIG. 15 is a graph showing the low-strain summary of hyperelastic mechanical properties at 23 C. FIG. 16 is a graph showing the mid-strain summary of hyperelastic mechanical properties at 23 C. FIG. 17 is a graph showing the high-strain summary of hyperelastic mechanical properties at 23 C.

Further large scale testing of an impact system incorporating the elements showed desirable properties where the polyurethane wall elements showed high levels of G-force reduction and recoverability of the polyurethane elements.

Large-scale testing of an energy absorption system incorporating these hyperelastic elements showed desirable high level of G-force reduction and recoverability of the polyurethane elements during testing.

Figure 18:
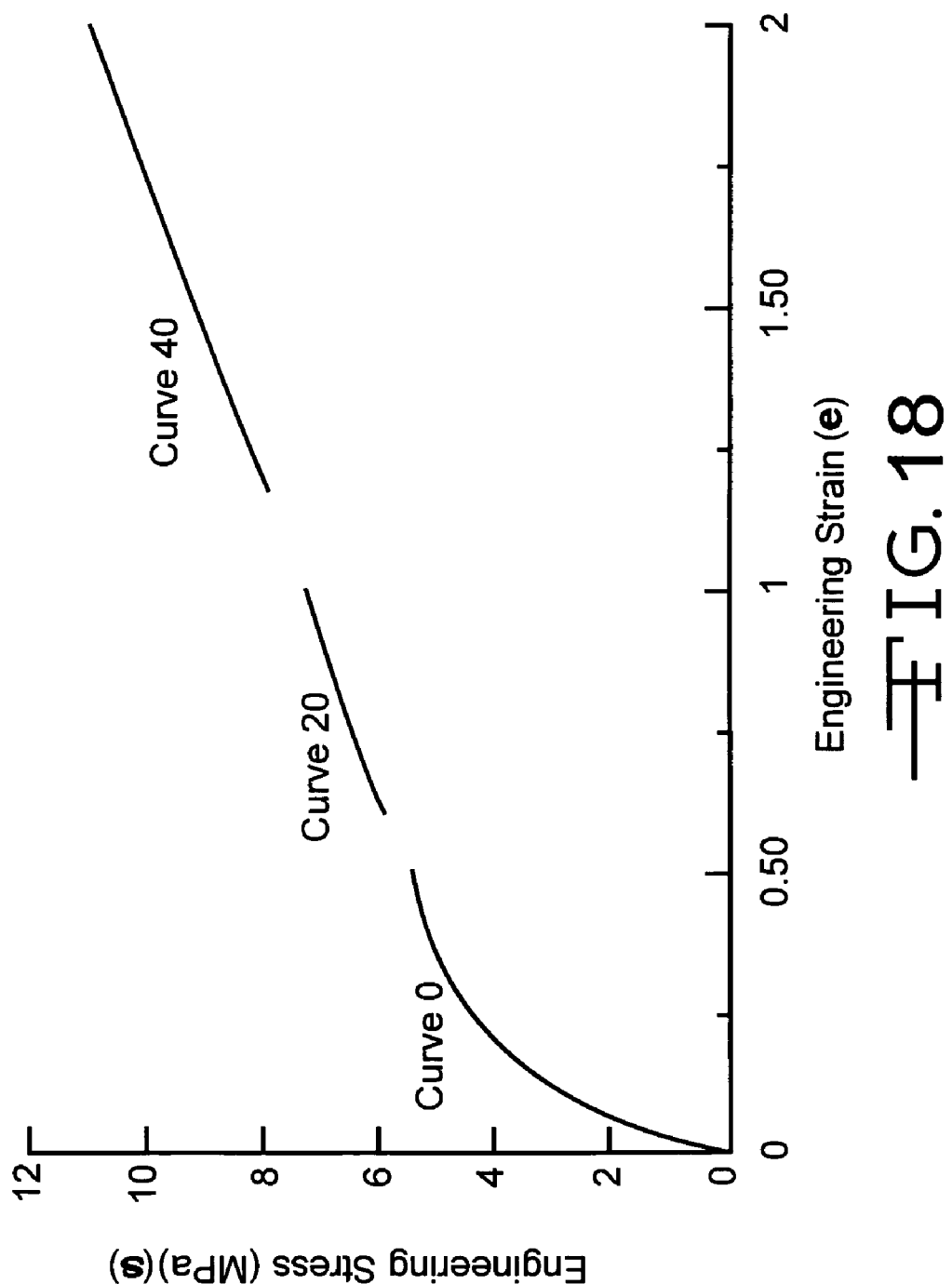
FIG. 18 is a graph showing representative stress-strain curves for energy absorbing materials.

The mechanical performance of the material in these large-scale tests is shown in FIG. 18, which represents the typical stress-strain behavior of the novel energy absorbing material. It should be noted that this material can display moderate strain rate dependence below 10 $s^{-1}$, but it is desired that for use in an impact attenuator system, the material is desired to have minimal strain rate dependence up to 900 to about 1000 $s^{-1}$.

The hyperelastic materials having the specifications described herein have not been in existence before this invention thereof. Further, the hyperelastic material displays these unique performance criteria and constraints given the high kinetic energies, strains and strain rates involved.

EXAMPLE 2

Composition of the Hyperelastic Material

The hyperelastic material of the present invention was prepared using an MDI-polyester prepolymer having a free isocyanate content of approximately 19%. A separate long chain polyester component based on ethylene/butylene adipate was utilized. The polyol had an OH# of approximately 56. The short-chain diol utilized was 1,4-butanediol and accounted for approximately 18% by weight of the total hydroxyl-containing components of the mixture.

Reactive components were combined in a proportion that provided approximately 5% excess of isocyanate groups in the total mixture. A catalyst package was utilized which facilitated the chemical reaction of the components and allowed demold of the parts within a reasonable time frame. The gel time or work life of the system should not be shorter than the mold filling time to ensure uniform material properties throughout all sections of the part. The catalyst system contained a blend of a tertiary amine catalyst and a tin-based catalyst. A 4:1 weight ratio of the amine component to the tin component provided desirable processing characteristics. A total catalyst loading of 0.026% by weight was used to provide a gel time of approximately 2.25–2.50 minutes.

This level of reactivity allowed ample pour time and minimized de-mold time during manufacture.

EXAMPLE 3

Process for Making Hyperelastic Material

A three component liquid casting machine equipped with a precision gear pump to accurately meter components and a dynamic mix head to obtain adequate mix quality and heating capability were used. The prepolymer, polyol and short-chain diol reactive components were charged into holding tanks heated to approximately 110° F. Approximate amounts of the catalyst components were added to the tank containing the short chain diol and mixed thoroughly. All components were then degassed under a minimum vacuum of 28 inches Hg until all dissolved gasses were removed. A dry nitrogen pad was then applied to each tank to protect components from moisture exposure. Pad pressure must be adequate to ensure material feed to a suction side of a metering pump. Each pump was calibrated to ensure delivery of an appropriate amount of the respective component to the mix chamber. The total material throughput was approximately 16.5 pounds per minute. A mold was heated to an approximate range of 190° F. to 210° F. prior to dispensing mixed material into the cavity. The mold temperature was maintained at about 200° F. after pouring to ensure proper cure of the material prior to demolding the part. The part was demolded in approximately 20 minutes and subsequently post-cured at temperatures between about 200° F. to 250° F. for approximately 12 to 36 hours to ensure completion of the chemical reaction and attainment of material properties. The part was then aged a minimum of 21 days at ambient conditions prior to being placed into service as a racetrack safety barrier.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A roadway barrier comprising at least one hyperelastic energy absorbing member, wherein the hyperelastic member comprises an energy absorbing material having non-linear elastic behavior at strains exeeding about 1 and that behaves in a rate-independent hyperelastic manner capable of absorbing tremendous amounts of impact energy, while remaining fully recoverable, and maintains consistent force-displacement characteristics over a wide range of impact velocities.

2. The roadway barrier of claim 1, wherein the energy absorbing material has at least the properties of:
   a Shore A hardness value of at least about 90,
   elongation at break ranging from about 500 to about 700%, and
   Young's modulus ranging from about 4000 to about 6000 psi; and at least withstands:
strain rates of up to at least about 900–1000s$^{-1}$, and
tensile stresses ranging from at least about 4000 to at least about 7000 psi.

3. The roadway barrier of claim 1, wherein the energy absorbing material behaves in a hyperelastic manner under dynamic loadings of high strain rates of up to at least about 900–1000s$^{-1}$ and has non-linear elastic responses in energy absorbing applications.

4. The roadway barrier of claim 1, wherein the hyperelastic material comprises a thermoset cast polyurethane system material.

5. The roadway barrier of claim 1, wherein the hyperelastic material comprises a polyurethane elastomer.

6. The roadway barrier of claim 1, wherein the hyperelastic material comprises an energy absorbing hyperelastic material, comprising:
   a mixture of reactive components comprising an MDI-polyester and/or an MDI-polyether prepolymer,
   at least one long-chain polyester and/or polyether polyol,
   at least one short-chain diol, and
   at least one catalyst,
   the hyperelastic material behaving in a rate-independent hyperelastic manner and having a permanent set that is minimized so that the hyperelastic material absorbs tremendous amounts of impact energy while remaining fully recoverable when used in energy-absorbing applications,
   wherein the reactive components are combined in a proportion that provides about 1–10% excess of isocyanate groups in the total mixture.

7. The roadway barrier of claim 1, wherein the hyperelastic material behaves in a hyperelastic manner under dynamic loadings of high strain rates of up to at least about 900–1000s$^{-1}$ and has non-linear elastic responses in energy absorbing applications.

8. The roadway barrier of claim 1, wherein the polyester component is selected from the group consisting of polyglycol adipates and polycaprolactones, and wherein the polyether component is selected from the group consisting of polypropylene glycol, polyethylene glycol and combinations thereof.

9. The roadway barrier of claim 1, wherein the reactive components are combined in a proportion that provides about 5% excess of isocyanate groups in the total mixture.

10. The roadway barrier of claim 1, wherein said catalyst contains a blend of a tertiary amine catalyst and a tin-based catalyst.

11. The roadway barrier of claim 1, wherein the tertiary amine catalyst and the tin-based catalyst is in a ratio of about 4:1.

12. The roadway barrier of claim 1, wherein a total catalyst loading of about 0.026% by weight is used to provide a gel time of about 2.25 to 2.50 minutes.

13. The roadway barrier of claim 1, wherein the hyperelastic material comprises:
   a mixture of an MDI-ester prepolymer having a free isocyanate content of approximately 19%,
   at least one long-chain polyester polyol comprised of ethylene/butylene adipate diol with an OH# of approximately 56,
   at least one short-chain diol comprised of 1,4 butanediol that accounts for approximately 18% by weight of the total hydroxyl-containing components of the mixture, and
   at least one catalyst comprised of a tertiary amine catalyst and a tin-based catalyst in a ratio of about 4:1,
   wherein a total catalyst loading of about 0.026% by weight is used to provide a gel time of about 2.25 to 2.50 minutes,
   wherein the reactive components are combined in a proportion that provides about 5% excess of isocyanate groups in the total mixture, and wherein the hyperelastic material behaves in a rate-independent hyperelastic manner and has a permanent set that is minimized so that the hyperelastic material absorbs tremendous amounts of impact energy while remaining fully recoverable when used in an impact attenuator system.

14. The roadway barrier of claim 1, wherein the hyperelastic member has substantially tubular or columnar shaped sidewalls and at least one interior structural member.

15. The roadway barrier of claim 1, wherein the structural member generally has an X-shaped cross-section.

* * * * *